United States Patent [19]
Brown

[11] Patent Number: 5,910,845
[45] Date of Patent: Jun. 8, 1999

[54] PERIPHERAL VIEWING OPTICAL SCANNER FOR THREE DIMENSIONAL SURFACE MEASUREMENT

[76] Inventor: Thomas Mattingly Brown, 1430 W. 152nd Avenue, Broomfield, Colo. 80020

[21] Appl. No.: 08/982,763

[22] Filed: Dec. 2, 1997

[51] Int. Cl.[6] .................................................. G01B 11/24
[52] U.S. Cl. ............................................................. 356/376
[58] Field of Search .................................... 356/375, 376

[56] References Cited

U.S. PATENT DOCUMENTS

| | | | |
|---|---|---|---|
| 4,089,608 | 5/1978 | Hoadley | 356/156 |
| 4,238,147 | 12/1980 | Stern | 354/77 |
| 4,502,785 | 3/1985 | Truax | 356/376 |
| 4,529,316 | 7/1985 | DiMatteo | 356/376 |
| 4,531,837 | 7/1985 | Panetti | 356/376 |
| 4,627,734 | 12/1986 | Rioux | 356/376 |
| 4,705,401 | 11/1987 | Addleman | 356/376 |
| 4,737,032 | 4/1988 | Addleman | 356/376 |
| 4,846,577 | 7/1989 | Grindon | 356/376 |
| 5,018,854 | 5/1991 | Rioux | 356/376 |
| 5,028,799 | 7/1991 | Chen | 250/561 |
| 5,102,223 | 4/1992 | Vesugi | 356/376 |

OTHER PUBLICATIONS

Brian Curless/Marc Levoy Better Optical Triangulation Through Spacetime Analysis Technical Report: CSL–TR–95–667 Department of Electrical Engineering and Computer Science Stanford University, Apr. 1995.

*Primary Examiner*—Robert H. Kim
*Assistant Examiner*—Amanda Merlino

[57] ABSTRACT

The invention is an improved method and apparatus for non-contact measurement of three dimensional object surfaces. Light planes, projected from each side of a video sensor, intersect along the center field of view of the video sensor, and exit the field of view of the video sensor on the opposite side of the video sensor from the point of projection. The light planes illuminate object surfaces that are sensed by the video sensor. Electronic circuits measure the edge position and width of points illuminated by the light planes on the object surface, and provide the measurement data to a digital computer. The apparatus has no moving parts except a mechanism providing motion of the object relative to the apparatus, so to progressively view the entire object. Calibration methods compensate for the effects of mechanical alignment errors, and distortions of the video sensor optical lens. The invention is significant because of its simplicity, speed, and the arrangement of light sources and video sensor that provides a peripheral view of an object surface, greatly increasing the sensed object surface area.

4 Claims, 18 Drawing Sheets

PERIPHERAL VIEWING OPTICAL SCANNER FOR THREE DIMENSIONAL SURFACE MEASUREMENT

FIELD OF INVENTION

This invention relates to non-contact surface scanning measurement methods and apparatus, and more particularly, to methods and apparatus that provide high data rates to minimize the time of measurement.

BACKGROUND OF THE INVENTION

Prior art surface measurement methods and apparatus are limited to incomplete surface detection due to the effects of shadowing of the light beam by features of the objects being scanned. An example of this is U.S. Pat. No. 4,089,608.

Arrangement of light planes may also create a problem of incorrectly distinguishing light sources for those surfaces that lie beyond the point of intersection of the light planes. U.S. Pat. No. 4,705,401 is an example illustrating this problem.

U.S. Pat. No. 4,737,032 addresses the previously described problems by an arrangement employing a single light source and multiple optical points of view. The multiple points of view are achieved using a single video sensor, and a series of mirrors and optical beam splitting, which increases the complexity of the apparatus.

U.S. Pat. No. 4,705,401 illustrates another problem associated with apparatus that employs light planes to create a contour line on an object. Due to the slope and features of the object as seen from the perspective of the video sensor, the light plane may illuminate very wide areas, or even multiple distinct points on an object surface. When the light plane appears very wide to the sensor, video peak detection methods may detect a video peak which does not coincide with the center of the light plane.

When multiple distinct points on an object surface are illuminated by a singular light plane, multiple video peaks may be detected by the video sensor causing ambiguities and errors in measurement. U.S. Pat. Nos. 4,705,401 and 4,737,032 are both examples which display this problem.

Particularly in linear motion applications, certain arrangements of light sources and video sensor are capable of detecting only the highest surfaces of an object, that is, surfaces closest to the light source, and cannot detect the presence of surface features of the object which may be located physically beneath a higher surface of the object. U.S. Pat. Nos. 4,705,401 and 4,737,032 are both examples that display this limitation. This limitation is caused by the direct association of the X coordinate to the mechanical position of the scanning apparatus.

Due to the direct association between the mechanical X position of the scanning assembly and the object, only one Z measurement can be made for a specific X/Y coordinate. This limitation results in only a 2 dimensional array of Z values being produced, that can describe only the highest surfaces features of an object.

SUMMARY OF THE INVENTION

It is an object of the present invention to provide an apparatus geometry and signal processing method to maximize the amount of surface measurement information collected, while minimizing the time required to perform the measurement.

It is another object of the present invention to minimize the total complexity of the apparatus by minimizing the total number of components.

Other objects and advantages of the present invention will become apparent as the description proceeds.

Multiple light sources produce thin planes of light that illuminate an object, producing contour lines on the surface of an object.

The contour lines are observed by a scanning video sensor, for example a video camera, that produces video responses corresponding to points along the contour lines.

The arrangement of the light sources relative to the video sensor provides simultaneous multiple peripheral perspective views of the contour lines on different portions of the object surface.

Part of the apparatus provides for relative movement of the object, or the sensing apparatus.

Movement is generally linear, but may be rotational within a single perspective.

When movement is linear, the arrangement of the light sources allows the video sensor to observe and measure object surface features that reside below higher surface features of the object.

The position of the object relative to the apparatus, as well as the position of the contour line in the video sensor field of view, provide information defining the coordinates of points along the contour lines.

Calibration information for light planes that are at unknown angles from the video sensor center of the field of view, is derived by the sequential sensing of objects of known shape, and known angle from the plane of movement.

The methods of calibration reduce the need for precise mechanical alignment, and allow the video sensor to utilize a variety of optical lens types, best suiting the object surface and object size to be measured.

Electronic circuits measure an edge position of a video response and the duration of the video response, associated with the contour line observed by the video sensor.

The duration of the video response provides statistical data relating to the reflectivity of the object surface.

The edge position data and statistical data, along with indexing information are stored sequentially, as encountered, for computer processing.

By processing the image data from multiple perspectives, the problems of shadowing are minimized.

DESCRIPTION OF THE PREFERRED EMBODIMENT

Optical Scanner Configuration

Figure 1:
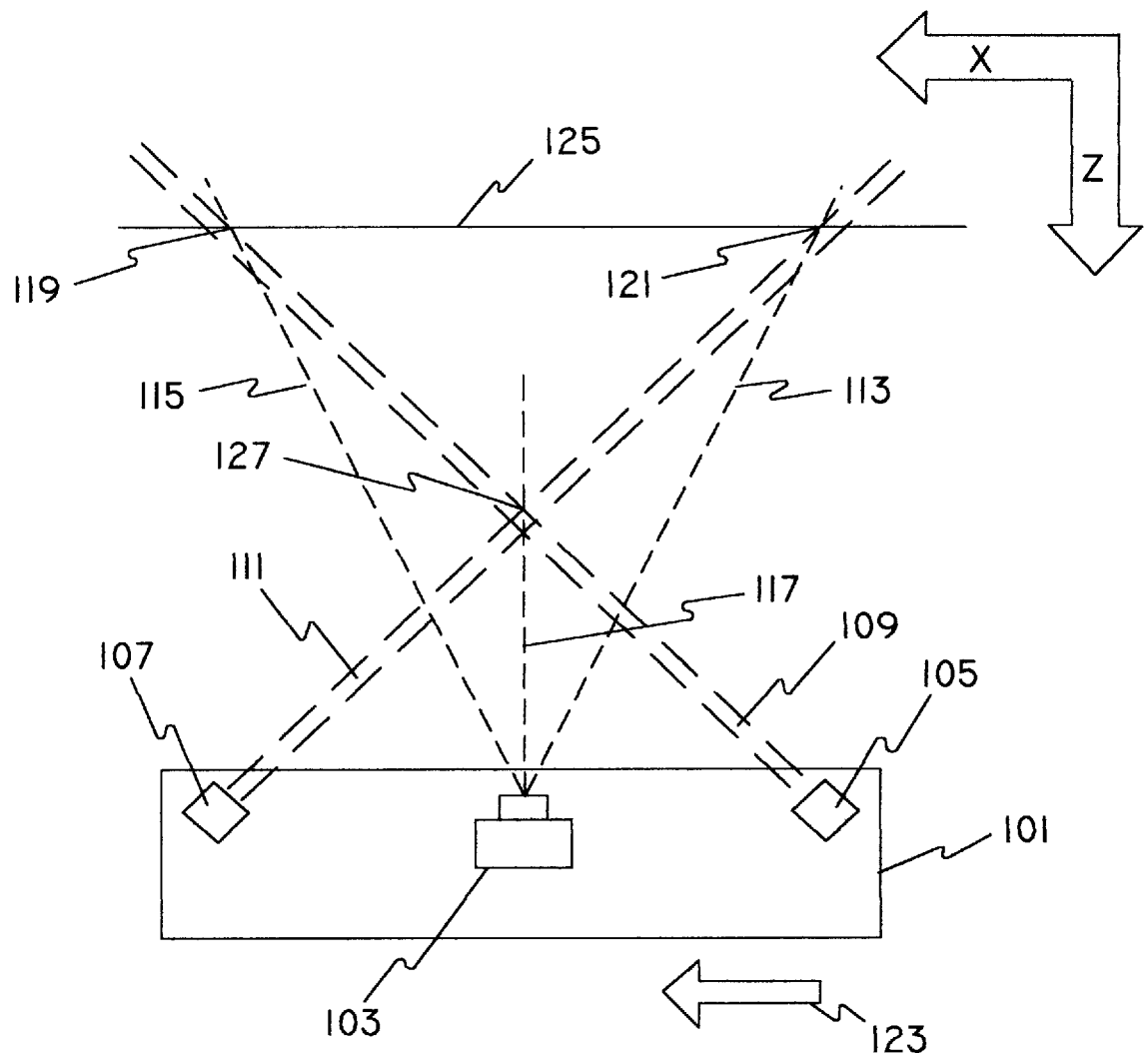
FIG. 1 shows the measuring geometry of the scanning assembly.

FIG. 1 shows the measuring geometry of the scanning assembly, of the present invention, wherein data is collected in a linear coordinate mode.

A scanning assembly 101 contains a video sensor 103, such as a video camera, and light sources 105 and 107. The light sources are located on each side of the video sensor at substantially equal distance from the video sensor.

The light sources produce thin light planes 109 and 111, perpendicular to the plane of the Figure and substantially narrower than the video sensor field of view. The light planes exit the video sensor field of view, illustrated by edge field of view lines 113 and 115, on the opposite side of the video sensor from the origin of the light planes, at light plane exit points 119 and 121. The light sources may be of any type which will produce a predictable video response from the video sensor, for example incandescent, laser, or infrared.

The center of the field of view of the video sensor, illustrated by line 117, is aligned perpendicular to the relative direction of motion, illustrated by arrow 123.

The light planes exit from the video sensor field of view at exit points 119 and 121, and a line 125 connecting these two points is parallel to the direction of motion, illustrated by arrow 123. The light planes are aligned to an intersection point 127 that lies on center line 117 of the field of view of the video sensor.

An object can be measured if the relative motion of the object moves the object through the area within the triangle formed by points 119, 121, and 127. This area is the possible range of measurement.

Video Representation

Figure 2A:
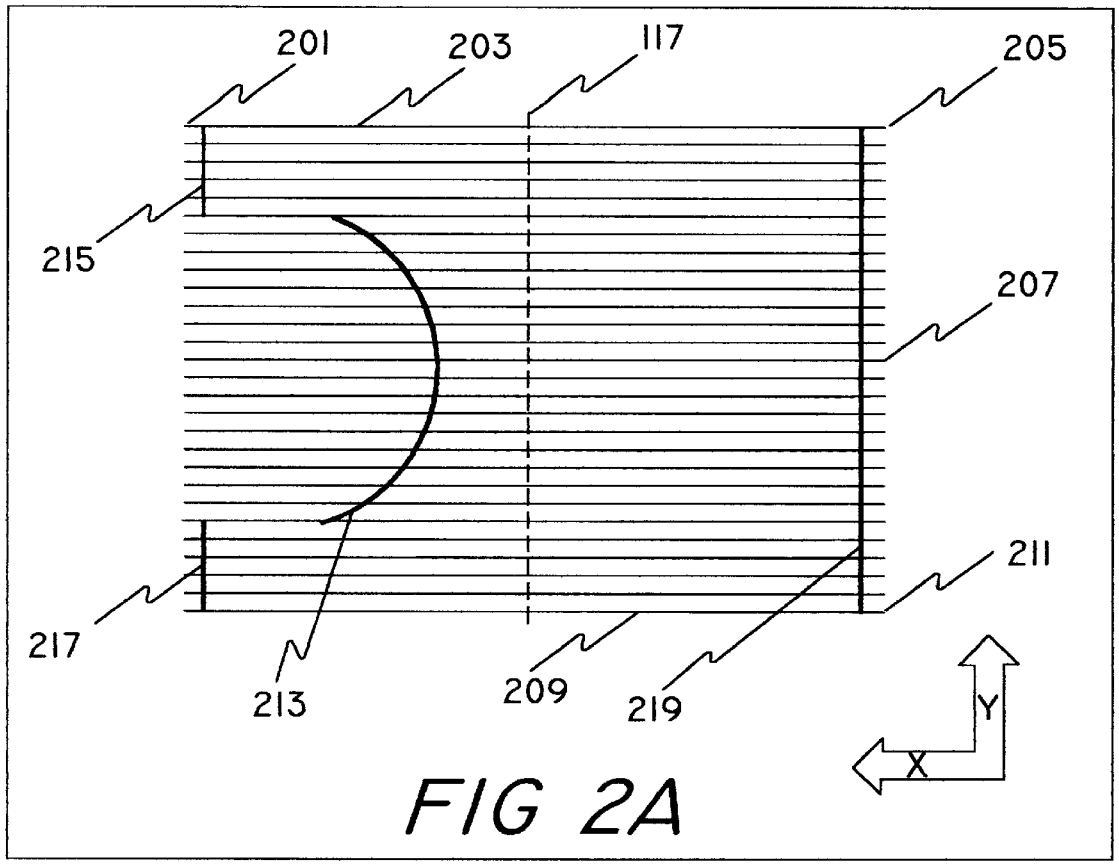
FIGS. 2A and 2B illustrate a single frame of the image field of the video sensor while sensing object surfaces.
Figure 2B:
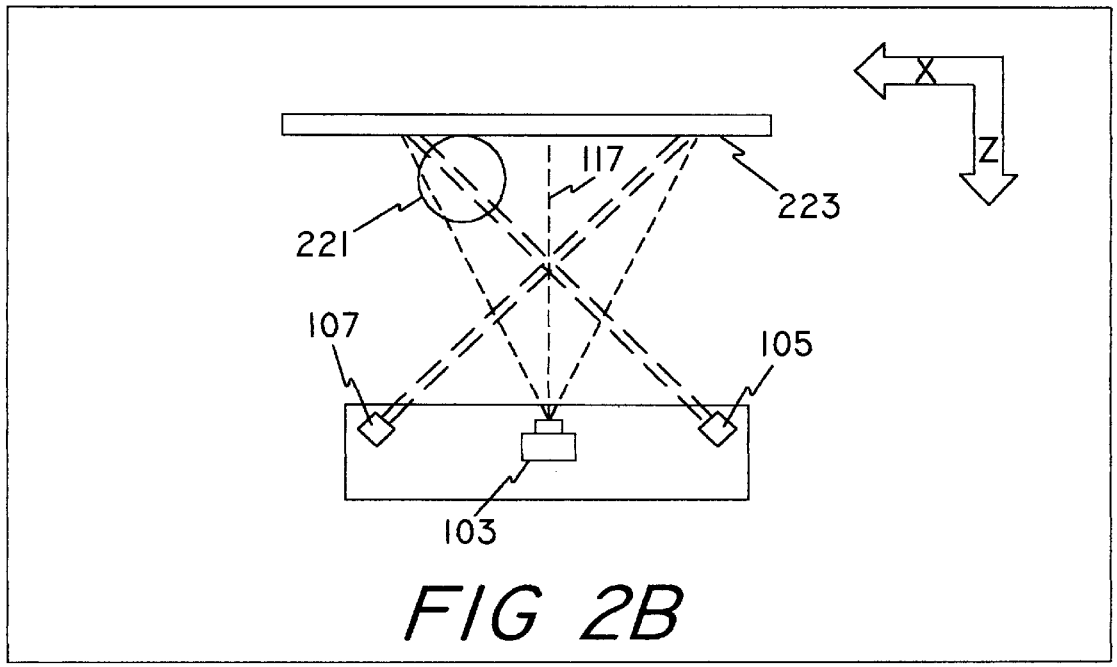

FIGS. 2A and 2B illustrate a single frame of the image field of the video sensor while sensing object surfaces. One of the objects, represented by object 223 of FIG. 2B, that is being illuminated, and sensed by the video sensor 103, is a flat surface that is parallel to the X and Y axis of the video sensor, and vertical to plane of the Figure. For example, a wall that extends through the entire field of view of the video sensor.

The other object being illuminated, and sensed by the video sensor 103, is a spherical shaped object, represented by object 221 of FIG. 2B. Object 221 has a diameter that is less than the vertical field of view of the video sensor.

FIG. 2A shows the horizontal sweep beginning at the upper left point 201 and proceeds on the first horizontal line 203 to the center point of the horizontal sweep, that corresponds to the center line 117 of the field of view of the video sensor, and continues to the upper right point 205, which is the end of the horizontal sweep. The sweep then retraces and continues downward through the center horizontal line 207, and continues downward until the last horizontal line 209 sweep of the video frame is complete at the lower right point 211.

Contour lines 213, 215, 217, and 219 are representative of observing the objects shown in FIG. 2B. The contour lines are created by the illumination of points on the objects surfaces by the light planes, and observation by the video sensor, that produces a video response at corresponding points on the horizontal sweep lines.

Because the diameter of spherical object 221 is less than the vertical field of view of the video sensor, not all horizontal lines will sense the spherical shaped object. Illumination of the spherical shaped object surface by light source 105, produces the contour line 213 as observed by the video sensor 103.

Illumination of the flat object 223 surface above and below the spherical object by light source 105, produces contour lines 215 and 217. Illumination of the flat object surface by light source 107, produces contour line 219.

Optical Viewpoints

FIGS. 3, 3A, 3B and 3C show the results of scanning recessed object surfaces.

The motion, represented by arrow 300, moves object 301 relative to the video sensor 103, causing light plane 109 to intersect with, and illuminate surface features of the object. Surface features of the object that exist in a recess 303, which physically resides beneath another portion of the object surface, may be illuminated by light plane 109 and observed by the video sensor 103, except for hidden surface area 305 which cannot be observed because of the obstruction of view by other features of the object surface. The angle of the light plane and the angle of the obstruction of view 307, defines the maximum depth of recessed surfaces which may be illuminated and observed by the video sensor.

Figure 3:
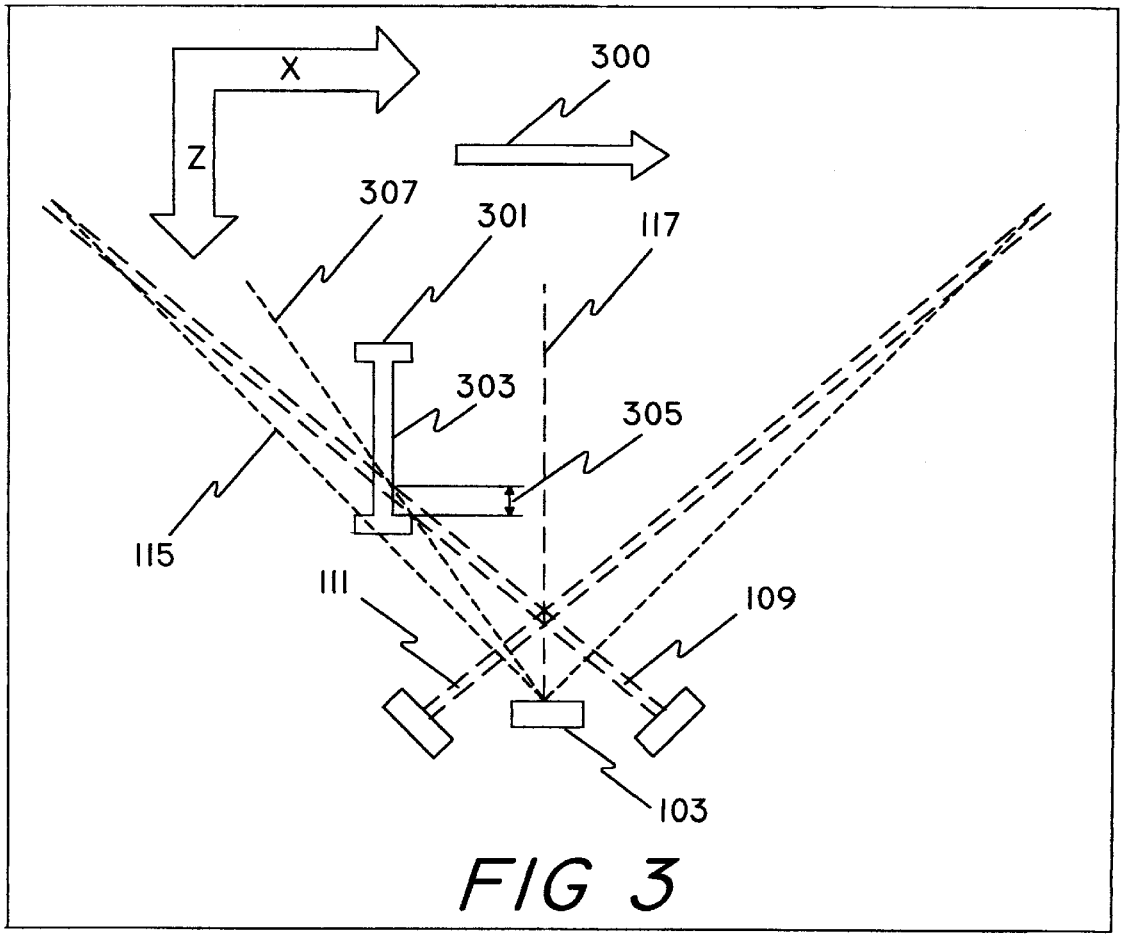
FIGS. 3, 3A, 3B and 3C show the results of scanning recessed object surfaces.
Figure 3A:
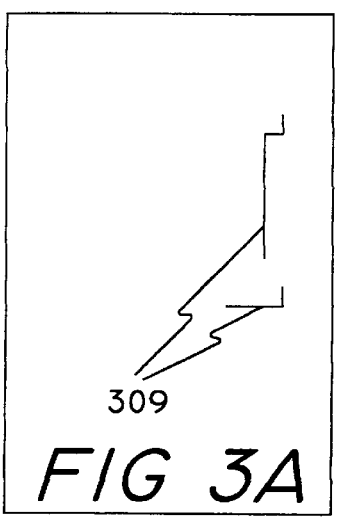

FIG. 3A shows the surface areas 309 of object 301 which were illuminated by light plane 109 and observed by the video sensor, after being moved through the light plane.

Figure 3C:
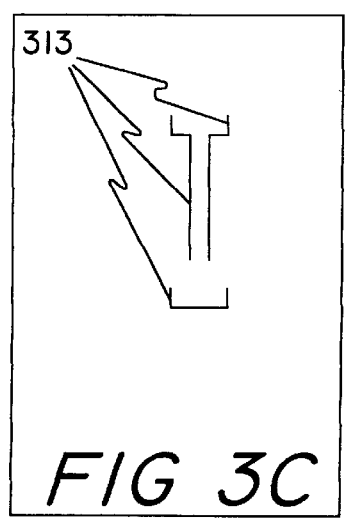
Figure 3B:
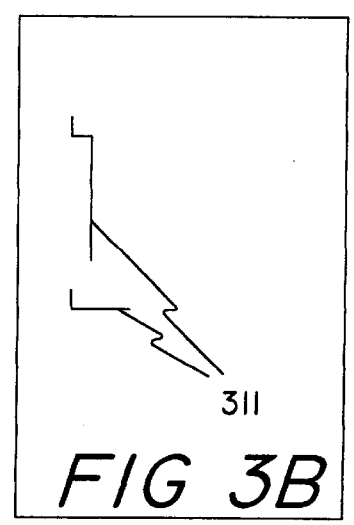

FIG. 3B shows the surface areas 311 of object 301 which were illuminated by light plane 111 and observed by the video sensor, after being moved through the light plane.

FIG. 3C illustrates the entire illuminated surface areas 313 of object 301 that were observed by the video sensor, after being moved through both light planes.

Light Plane Reference Edges

Figure 4:
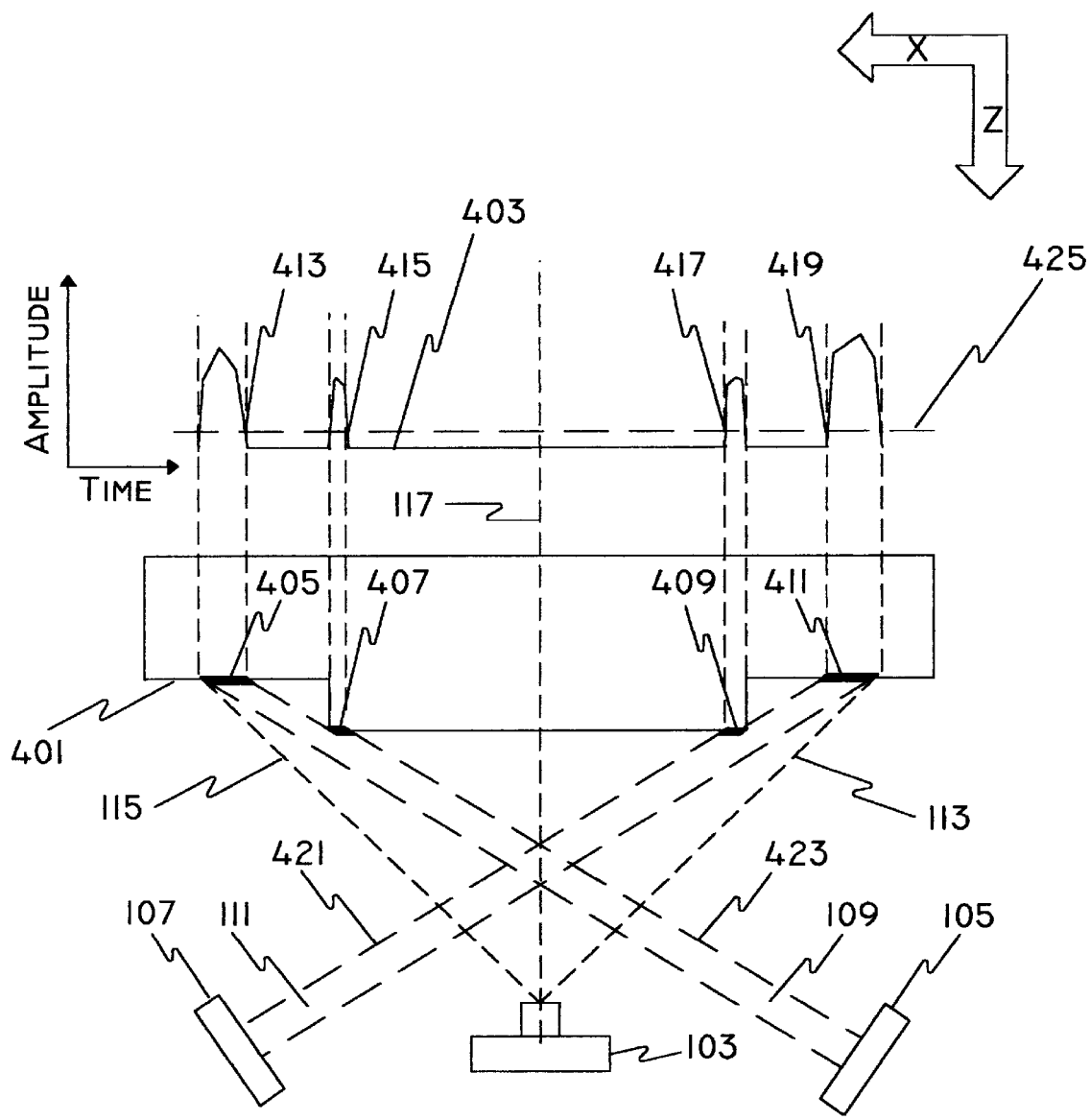
FIG. 4 shows an irregular object surface and resulting video responses.

FIG. 4 shows an irregular object surface and resulting video responses.

This figure is an illustration of the view observed by the video sensor 103 of an irregular object surface 401, and the changes in amplitude of the video signal 403 produced by the video sensor during the period of a single horizontal sweep.

The points of intersection of object surface 401 and of light plane 109, produced by light source 105, illuminate areas 405 and 407 on the surface of the object.

Illuminated areas 405 and 407 produce changes in the amplitude of the video signal during the horizontal sweep that correspond to the illuminated areas. Because multiple areas of the surface may be illuminated by light plane 109 and viewed by the video sensor 103, the edge 423 of light plane 109, representing the trailing edge of the video response 415, is used as the reference edge for all measurements derived by light plane 109 and the video sensor 103. Any video response, for example video response 413, is disregarded if another video response 415 occurs prior to the point in time when the horizontal sweep crosses the center line 117 of the field of view of the video sensor.

The same effect of multiple illuminated areas can occur after the point in time when the horizontal sweep crosses the center field of view, as the object surface is illuminated by light plane 111 of light source 107. Illuminated area 409 and 411 of the object surface produce changes in the amplitude of the video signal during periods of the horizontal sweep which correspond to the illuminated areas.

In the period of time after the horizontal sweep crosses the center line 117 of the field of view of the video sensor, the edge 421 of light plane 111, which represents the leading edge of video response 417, is used as the reference edge for all measurements derived by the light plane 111 and the video sensor 103. Any video response that occurs after the first video response 417, for example video response 419, is disregarded in the period of time after the horizontal sweep has crossed the center line 117 of the field of view of the video sensor.

All video responses are qualified by the response amplitude exceeding an electrical threshold level 425, which is arbitrary, but set high enough to avoid background noise.

The leading or trailing edge of a video response is determined by the period in time when the rising edge of the video response 417 exceeds the threshold level, or the falling edge of the video signal 415 becomes less than the threshold level.

Electronics

Figure 5:
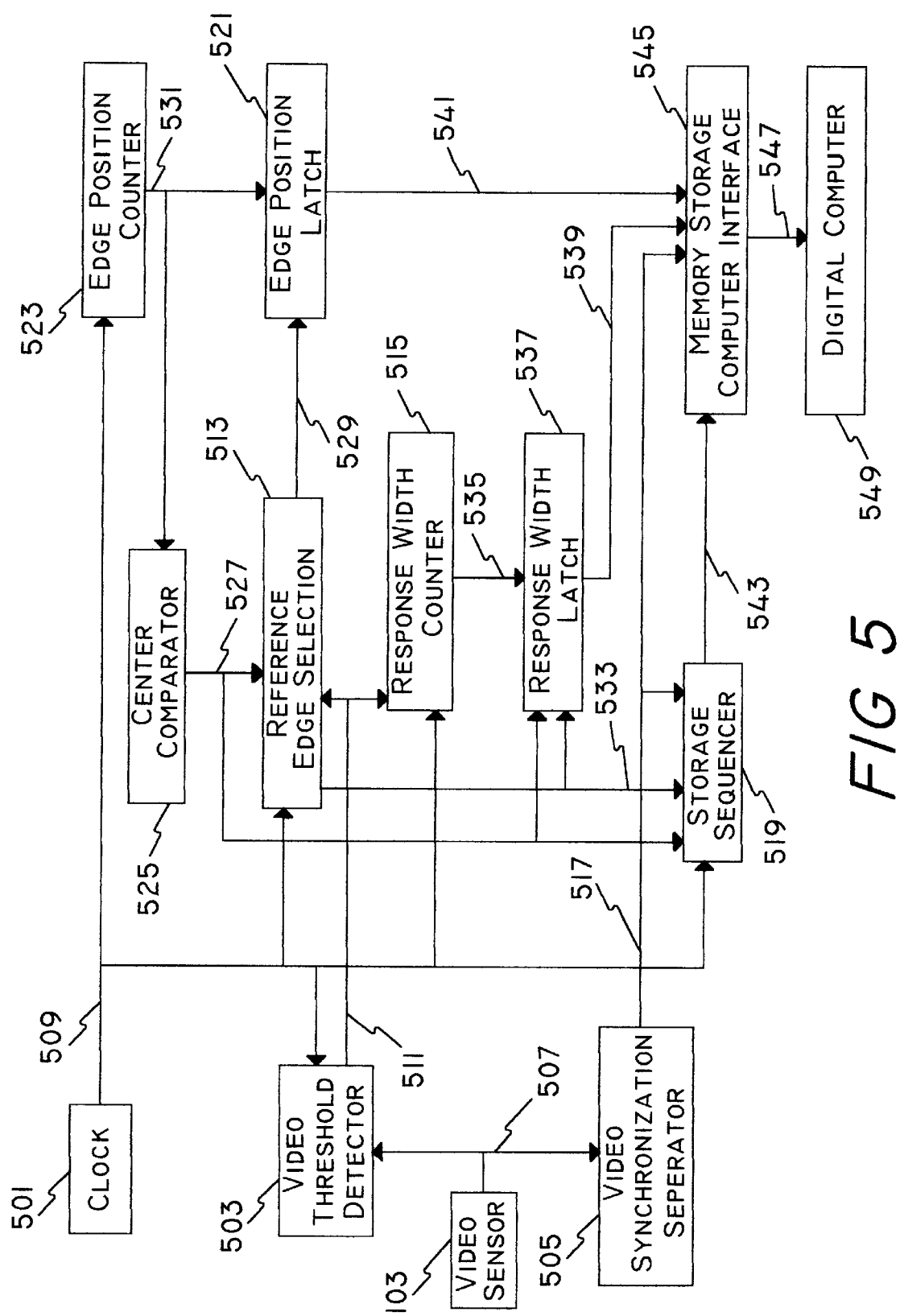
FIG. 5 shows a block diagram of the electronic circuits for processing the electronic signal from the video sensor.

FIG. 5 shows a block diagram of the electronic circuits for processing the electronic signal from the video sensor 103.

All operations performed by the electronic circuits are timed by, and synchronized to a clock signal 509, produced by a clock 501.

The video sensor 103 provides an electronic signal 507 containing video responses and synchronization information, in a standard electrical format, to a video threshold detector 503, and a video synchronization separator 505.

The video threshold detector 503 compares the amplitude of the video responses to an electrical threshold level, producing a qualified video response signal when the threshold level is exceeded by the video response. As discussed above, the threshold level is arbitrary, so long as it exceeds the normal background noise level.

The video threshold detector 503 synchronizes qualified video responses to the clock signal 509, producing a synchronized video response 511 signal that is provided to a reference edge selection 513 circuit, and a response width counter 515 circuit.

The video synchronization separator 505 detects the synchronization portion of the electronic signal 507 from the video sensor 103, and provides separated synchronization information 517 to a storage sequencer 519, and a memory storage computer interface 545.

An edge position counter 523 is used to measure the position of the synchronized video response 511 in a horizontal sweep. During each horizontal sweep, the edge position counter 523 counts up from zero, at the start of the horizontal sweep, to a maximum value, at the end of the horizontal sweep. The edge position counter maximum value is a constant value, determined by the constant period of the clock signal 509, and the constant period of the horizontal sweep. For example, assuming that the duration of a single horizontal sweep is 0.000,06 second, and the clock signal 509, clocks the edge position counter 523 at a rate of 33,333,333 cycles per second, then the maximum value is approximately 2,000. In this example, the clock rate provides approximately 1000 measurable points between the start of the horizontal sweep and center point of the horizontal sweep, and approximately 1000 measurable points between the center point of the horizontal sweep and the end of the horizontal sweep. Higher clock rates will result in a higher maximum value, as well as a higher value associated with the center point of the horizontal sweep. Higher clock rates also increase measurement resolution, since there are more measurable points along the horizontal sweep.

A relationship exists between the position of the video response in the horizontal sweep associated with the contour line on the surface of an object, and the height and position of the contour line. As a contour line on the surface of an object moves closer to the video sensor plane of motion, the position of the video response in the horizontal sweep associated with the contour line, moves increasingly closer to the center point of the horizontal sweep. As a contour line on the surface of an object moves closer to the video sensor plane of motion, the distance decreases between the center field of view of the video sensor and the contour line on the surface of the object. This relationship is used to determine the height of the contour line, and its position within the field of view of the video sensor.

An edge position latch 521 captures an edge position counter value 531 when triggered by a set latch signal 529.

A center comparator 525 produces a center signal 527 when the edge position counter value 531 equals the value of the center point of the horizontal sweep, that corresponds to the center field of view of the video sensor. The center comparator 525 provides the center signal 527 to the reference edge selection 513 circuit, the storage sequencer 519 circuit, and a response width latch 537 circuit.

Reference edge selection 513 controls the latching of edge position counter values 531, by generating the set latch signal 529 to the edge position latch 521, based upon which side of the center field of view that a video response is received, as described above in the Light Plane Reference Edges description of FIG. 4.

During the period of the horizontal sweep that occurs before the center signal 527 indicates center field of view, reference edge selection 513 generates the set latch signal 529, that triggers the edge position latch 521, on the trailing edge of every synchronized video response 511. During the period of the horizontal sweep that occurs after the center signal 527 indicates center field of view, reference edge selection 513 generates the set latch signal 529, that triggers the edge position latch 521, on the first leading edge of the first synchronized video response 511.

Reference edge selection 513 provides a latch reference signal 533 to the storage sequencer 519, and the response width latch 537. The latch reference signal 533 occurs when edge position values have been latched, both before and after the occurrence of center signal 527.

The electronic video signal output of video cameras has a wide range of amplitude because of the variations in reflectivity of the object surface. The width of the video response also varies with the amplitude variations. To increase measurement accuracy, the response width counter 515 measures the duration of the synchronized video response 511, associated with an edge position value 541 captured by the edge position latch 521. The measured duration of the synchronized video response provides statistical information to a digital computer 549, permitting the computer to compensate for the effects of reflectivity.

During the horizontal sweep, when any synchronized video response 511 occurs, the response width counter 515 is allowed to count for the duration of the synchronized video response. When the trailing edge of the synchronized video response occurs, the value in the response width counter 515, that is a response width counter value 535, may be captured by the response width latch 537. The response width counter 515 is then set to zero, in preparation for counting the duration of the next video response.

During the period of a horizontal sweep that occurs before the center signal 527 indicates center field of view, the response width latch 537 will latch the responses width counter value 535 when the trailing edge of every synchronized video response occurs. In this way, only a response width value 539 of the last video response is present in the response width latch 537 when the center signal indicates center field of view.

During the period of the horizontal sweep that occurs after the center signal 527 indicates center field of view, the response width latch 537 will latch the response width counter value 535 when the trailing edge of the first synchronized video response occurs. In this way, only the response width value 539 of the first video response is present in the response width latch when the end of the horizontal sweep occurs.

An image data word is a binary digital word containing fields for the edge position value 541, the response width value 539 and synchronization information 517. The storage sequencer 519 controls sequencing image data words to the memory storage computer interface 545 that is accessed by the digital computer 549.

For each sweep of a horizontal line, the storage sequencer 519 generates a storage control signal 543 that stores an image data word when the center signal 527 occurs if the latch reference signal 533 indicates an edge position counter value was latched before the occurrence of the center signal. However, if the latch reference signal 533 does not indicate that an edge position counter value has been latched before the occurrence of the center signal 527, the storage sequencer 519 does not perform a storage operation when the center signal occurs.

When synchronization information 517 indicates the end of the horizontal sweep has occurred, and the latch reference signal 533 indicates that an edge position counter value was latched after the occurrence of the center signal 527, the image data word is stored by the storage sequencer 519 with an indication that the horizontal sweep is complete. However, when synchronization information 517 indicates the end of the horizontal sweep has occurred, and latch reference signal 533 does not indicate that an edge position counter value was latched after center signal 527 occurred, any image data word that was stored when the center signal occurred is modified in storage by the storage sequencer 519, to include a digital reference indicating the horizontal sweep is complete.

If synchronization information 517 indicates the end of the horizontal sweep has occurred, and the latch reference signal 533 indicate no edge position counter values were latched before or after the occurrence of the center signal 527, the storage sequencer 519 stores an image data word containing an edge position value of zero, and a digital reference that the horizontal sweep is complete.

In the previously described method, the storage sequencer reduces the volume of data stored for each horizontal sweep to the minimum required to describe video responses from multiple optical perspectives.

The memory storage computer interface 545 provides a sufficient amount of storage to contain all image data words of a complete observation measurement sequence or, alternatively, may allow for the removal of image data words, across a computer interface 547 to the digital computer 549, as the image data words are provided by the storage sequencer 519, thus allowing for continuous observation measurements.

Calibrations

X/Z Calibration

Figure 6:
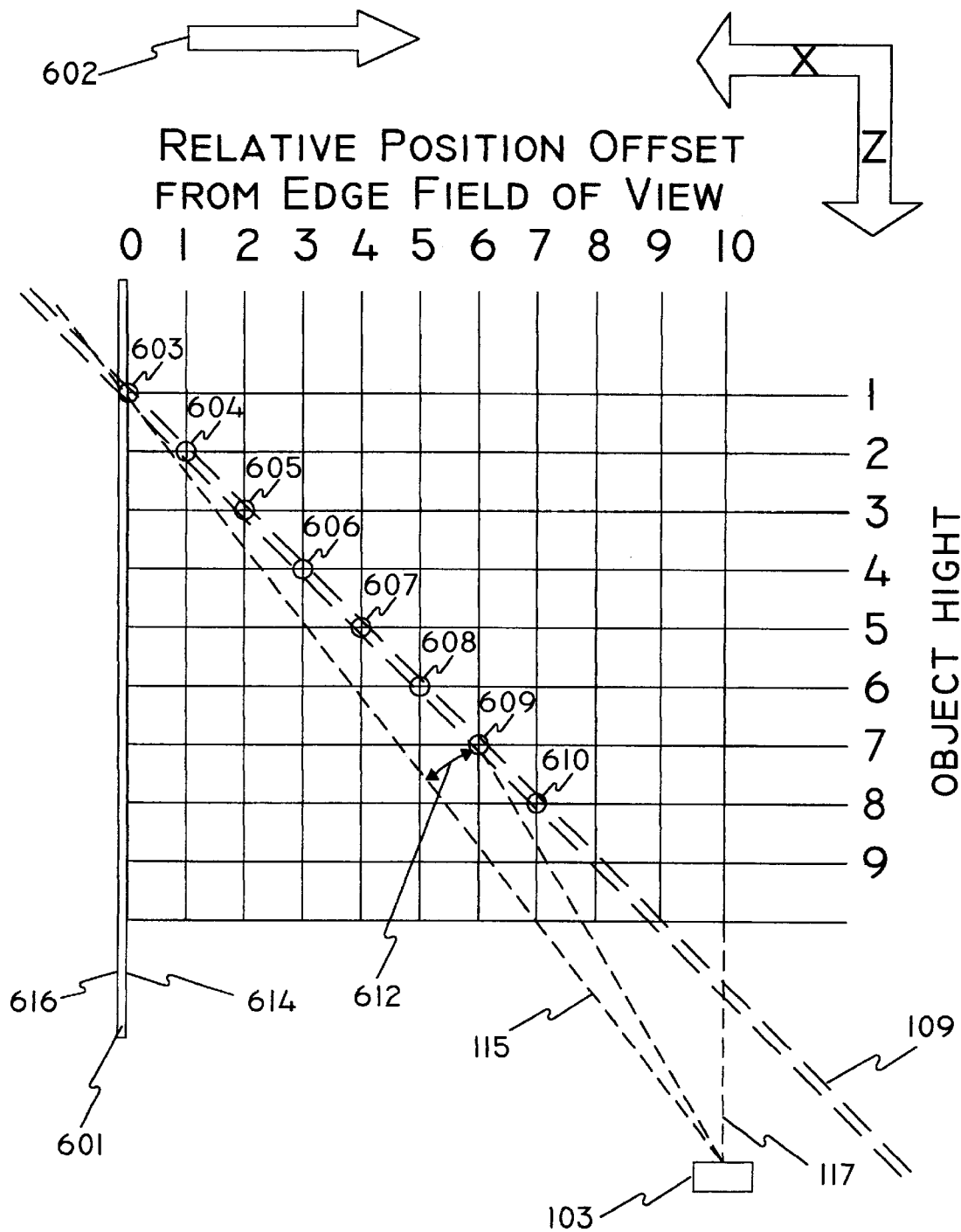
FIG. 6 shows the X/Z view of the X/Z calibration object.

FIG. 6 shows the X/Z view of the X/Z calibration object.

Object 601 has observable surfaces 614 and 616 that are perpendicular to the plane of the Figure and parallel to the Z axis of the Figure, and substantially parallel to the center line 117 of the field of view of the video sensor 103.

As motion, represented by arrow 602, moves object 601 within the edge 115 of the video sensor field of view, and continues towards the center line 117 of the field view of the video sensor, the surface 614 of the object is illuminated by light plane 109 and observed by the video sensor 103.

As the object relative motion proceeds, the point of surface illumination moves increasingly closer to the center line 117 of the field of view of the video sensor on each sequential video frame. This is represented by sequentially observed points 603 through 610. For example, an observed illumination by the video sensor represented by point 609 occurs at a position in the field of view 612 which away from the edge 115 of the field of view.

As discussed above, the angle of the observable surface of object 601 and is known to be parallel to the Z axis of the Figure, therefore, sequentially observed points 603 through 610 are known to physically exist at a common X position relative to the object.

The position of an observed illumination point in the video sensor field of view defines both the height of the illuminated point and its X position relative to the edge 115 of the field of view.

Because of the unknown angles of the light planes in relation to the video sensor center field of view, and the nonlinear characteristics of the video sensor lens, the following method provides a way of calibrating for the nonlinear characteristics of the video sensor lens and the unknown angles of the light planes.

The video sensor provides video data at a constant video frame rate. When the video sensor observes an object at a constant motion velocity, each sequential video frame represents an equal incremental amount of relative movement between the object and the video sensor. The actual distance moved for each video frame depends upon the velocity of motion between the object and the scanning assembly.

Each sequential video frame provides a sequential physical observation position of the object. A digital processor, connected to the video sensor electronic circuits, counts video frames to maintain a physical position reference.

The sequential observation at constant motion velocity of the calibration object 601, which has a surface plane that extends through the entire possible range of measurement, yields a linear change of the point of illumination on the surface of the object for each sequential observation. Each sequential observation of the object represents a constant incremental change in the distance of the illuminated point from the plane of the video sensor, and also from the edge field of view of the video sensor.

Because of the effects of the video sensor optic lens, the linear change of the illuminated point on the surface of the object, for each sequential observation, may not appear as a linear change in the position of the video response in a horizontal sweep line. However, since each sequential observation of the object yields a constant incremental change of distance between the illuminated point and the plane of the video sensor, the following association can be made. The position of a video response in the horizontal sweep line can be associated with a relative time when the illuminated point is observed by the video sensor. The relative time value increases as the illuminated point moves closer to the plane of the video sensor. Conversely, the relative time value decreases as the illuminated point moves further from the plane of the video sensor.

Since each sequential observation of the object will also yield a constant incremental change of distance between the illuminated point and the edge field of view of the video sensor, the following additional association can also be made. The position of a video response in the horizontal sweep line can be associated with a count of time since the first observation of the object at the edge field of view of the video sensor.

These two associations provide two calibration data values for any position of a video response in the horizontal sweep line. The first calibration value associates all edge position counter values, which are the video response positions, to the incremental physical distance from the plane of the video sensor. The second calibration value associates all edge position counter values, which are the video response positions, to the incremental physical position from the first illuminated observed point 603 within the edge 115 field of view of the video sensor.

The calibration data, representing distance of an illuminated point on the surface of an object from the plane of the video sensor, herein called Z calibration data, provides a digital processor with a method of translating an edge position value into a linear Z coordinate.

The calibration data, representing the position of an illuminated point relative to the first illuminated point within the video sensor edge 115 field of view, is herein defined as position calibration data.

Position calibration data provides a relative position offset value that, when applied to the frame count which is the physical position of the scanning assembly relative to the object, produces a common X coordinate position for all observed illuminated points of object surfaces 614 and 616.

Position calibration data provides a digital processor with a reposition value offset from the current physical position reference, that defines the X coordinate position.

Each light plane illuminates one side of the object surface 614, or 616, of calibration object 601.

Each light plane is associated with separate optical perspective views of the calibration object 601.

Assuming the actual X distance between surface 614 and 616 is less than one frame position of the scanning assembly at the calibration motion velocity, the X coordinate position developed is common to each perspective view. If the actual X distance between surface 614 and 616 is greater than one frame position at the calibration motion velocity, then compensation for the width of the object must be performed in order to produce a common X coordinate for surface 616 that is appropriate for the width of object 601.

Separate Z calibration data tables and position calibration data tables are developed for each optical perspective.

Z calibration data and position calibration data are derived at each sequential video frame position by using the edge position values from the center horizontal line.

Perspective Normalization Calibration

Figure 7:
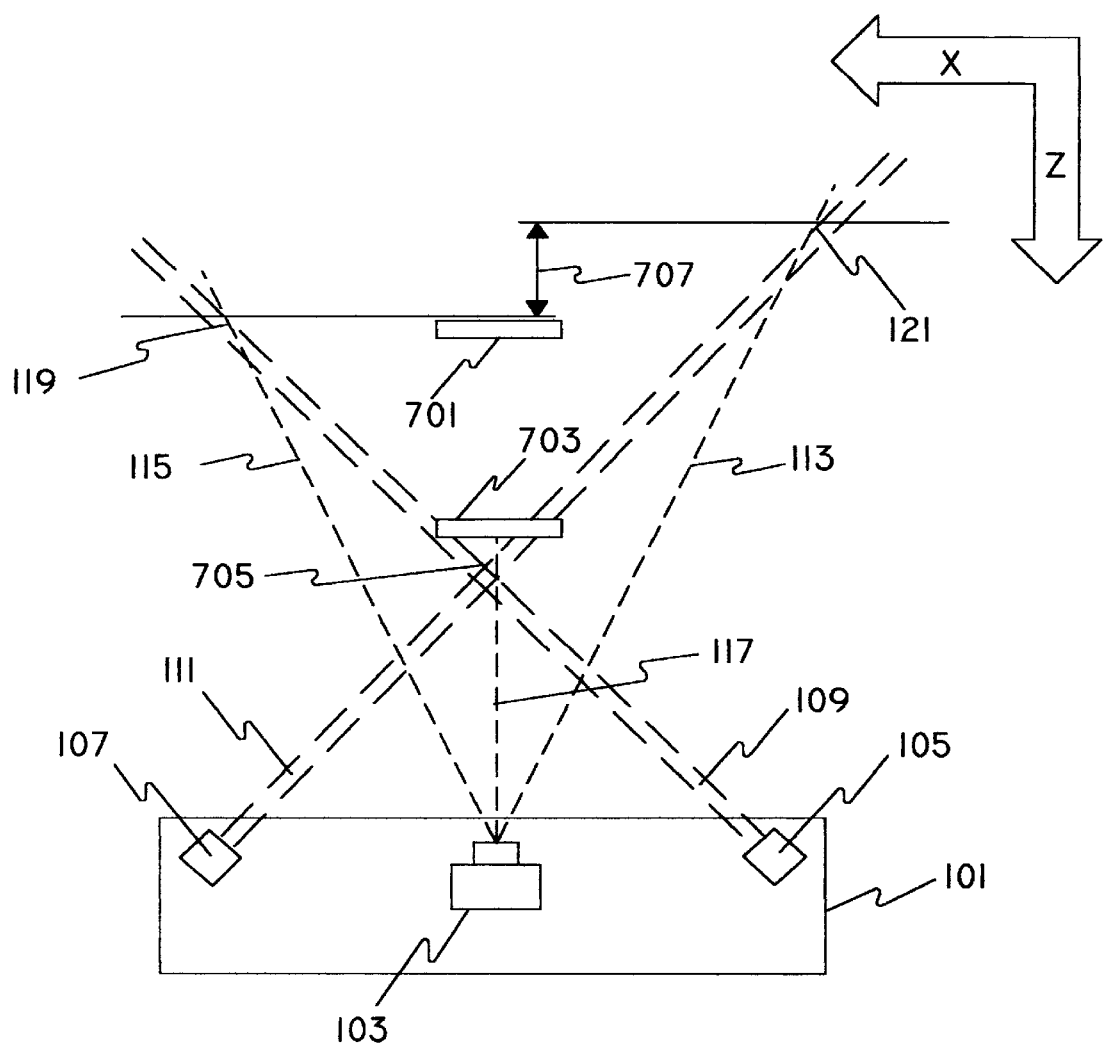
FIG. 7 shows a perspective normalization figure.

FIG. 7 shows a perspective normalization figure.

Both objects 701 and 703 have a flat surface that is parallel to the plane of the X and Y axis of the scanning assembly, and perpendicular to the plane of the Figure.

Because of possible mechanical alignment errors of the video sensor 103, and light sources 105 and 107, the point of exit of the light planes 109 and 111 from the video sensor field of view, at points 119 and 121, may not occur at the same distance from the video sensor, as shown by alignment distance error 707. Likewise, the intersection point 705 of the light planes may not occur along the center line 117 of the field of view of the video sensor.

Because of these possible alignment errors, when scanning an object such as the surface of object 701, the linear Z value detected in one perspective view for the surface of object 701 may not be the same linear value as detected by the other perspective view. Object 703 may also display differences in the linear Z values detected between the perspective views. In addition, the total difference of linear Z values between object 701 and 703 may not be the same in each perspective view.

The following method, called perspective normalization, provides a way to establish common reference points between the perspective views and compensate for possible mechanical alignment errors.

Object 701 is placed as far as possible from the video sensor while remaining close enough that both perspective views will illuminate and observe the object. Object 703 is placed as close as possible to the to the intersection point 705 of light planes 109 and 111, permitting a margin beyond that intersection, away from the video sensor, to allow for alignment errors. The margin should be enough to prevent the respective illuminated points of the light sources from being recognized on the incorrect side of the center line 117 of the field of view of the video sensor from where they are intended to be observed.

Object 701 is used to define a low common point reference value in each perspective viewpoint. When observing other objects, any object feature which produces an edge position value indicating the object feature is further from the video sensor than the low common reference point will be discarded and not measured.

During the period of time when measurements are made in perspective one, the electronics edge position counter will count from zero to the center field of view value. Any edge position value that is less than the edge position recorded for the perspective one low common reference point will be discarded and not measured.

During the period of time when measurements are made in perspective two, the electronics edge position counter continues to count from the center field of view value to the maximum count value of the horizontal sweep line. Any edge position value that is greater than the edge position recorded for the perspective two low common reference point will be discarded and not measured.

The edge position values that are not discarded will be translated to linear Z equivalents, using the Z calibration data of the detecting perspective. The linear Z value is then reduced by the linear Z equivalent of the low common point value of the detecting perspective. This reduction operation adjusts the linear low common value, to a value of zero for both perspective views.

The edge position value associated with object 703, from each perspective, is translated to its linear Z equivalent value, using the Z calibration data of its perspective. The resulting linear Z equivalent defines a linear high common point value for each perspective.

The linear high common point value of each perspective is also reduced by its linear low common point value, providing a linear zero adjusted high common point value for each perspective.

As previously described, the linear zero adjusted high common point values from each perspective may not be the same value, due to mechanical alignment errors.

In order to make the linear zero adjusted high common point values of each perspective equal, the larger of the two linear zero adjusted high common point values will be reduced.

If the lower of the linear zero adjusted high common point value is divided by the higher linear zero adjusted high common point value, a perspective reduction ratio of less than one is produced. The perspective reduction ratio is used during normal scanning operations to reduce the linear Z values of the perspective which has a higher zero adjusted high common point value. This reduction is performed by multiplying the linear Z value by the perspective reduction ratio, producing a reduced linear Z value that is the same as the linear Z value of the perspective that is not reduced.

For example, if perspective one has a linear zero adjusted high common point value of 1000, and perspective two has a linear zero adjusted high common point value of 900, then 900 divided by 1000 equals a 0.9 reduction ratio. In this example, all linear Z values of perspective one would be multiplied by 0.9 to produce linear Z values that are equivalent to those of perspective two.

A reduce perspective one indicator, or reduce perspective two indicator, that specifies which perspective requires reduction, and the perspective reduction ratio, are saved for use during normal scanning operations.

Perspective normalization data is derived using the edge position values from the center horizontal line.

Edge Position Normalization

Refer back to FIG. 6 that shows the X/Z view of the X/Z calibration object.

As described previously, when observing object 601 during a scanning sequence, for each sequential observation, the surface area illuminated by the light planes becomes increasingly closer or further from the plane of the video sensor, depending on the perspective that is observing the object.

Figure 8:
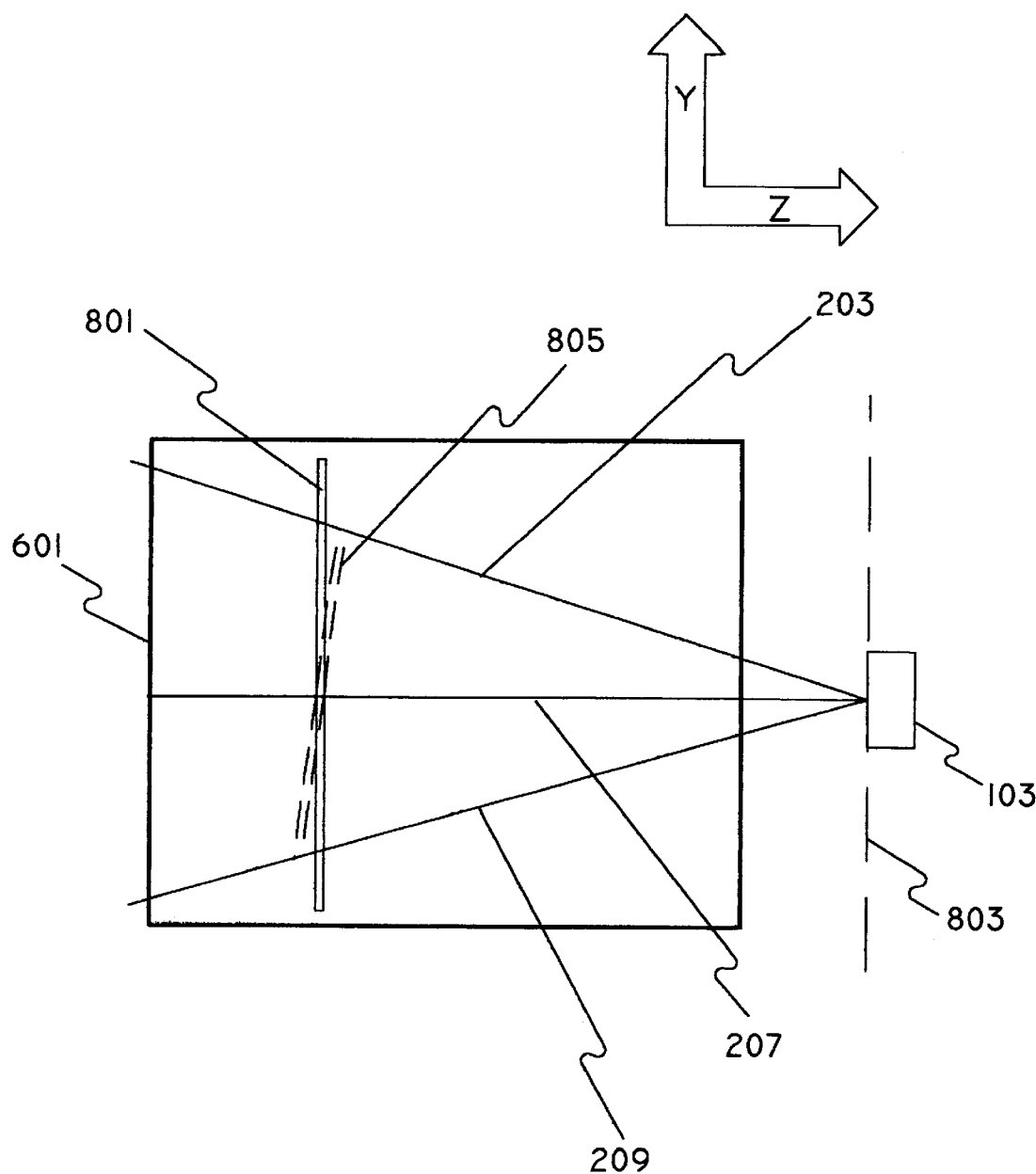
FIG. 8 shows the Y/Z view of the X/Z calibration object.

FIG. 8 shows the Y/Z view of the X/Z calibration object.

This view shows that object 601 occupies the entire vertical field of view of the video sensor 103, starting with the first horizontal line 203, through the center horizontal line 207, and continuing to the last horizontal line 209. Because, as previously described, the light planes project vertical planes of light, the illuminated area on the surface of the object 601 appears as a vertical illuminated line 801.

All points of the vertical illuminated line on the surface of object 601, at any sequential observation position, appear parallel to, and are at equal distance from the plane 803 of the video sensor.

Due to nonlinear characteristics of the video sensor lens, the position of the video responses in the horizontal sweep line, caused by the vertical illuminated line, may vary within a video frame. This effect is illustrated by distorted image line 805 that demonstrates the effect of this variation in the Z axis, as detected by the video sensor.

As previously described, the position of a video response in a horizontal sweep also influences the X position of an illuminated point. Because of the direct X relationship to the video response position in the horizontal sweep, nonlinear characteristics of the video sensor optical lens may also cause variations in the calculated X position of an illuminated point.

The amount the video response position may vary in the horizontal sweep is also influenced by the distance from the vertical illuminated line on the object surface, to the plane of the video sensor, as different portions of the video sensor lens optically effect the position of the video response.

The following method, called edge position normalization, provides a way to compensate for the previously described effects of the video sensor lens.

The center horizontal line is used as a center reference line for calibration. For every horizontal line of each video frame observing object 601, the edge position value of the center reference line is compared to the edge position value of every horizontal line of the current frame. The difference value between the edge position value of the center reference line, and the edge position value of another horizontal line, is saved as a response adjustment value that is specific for that horizontal line and edge position value.

During normal scanning operation, the horizontal line value and edge position value are used to address a location in the edge position normalization table that contains a response adjustment value, that pertains to a specific portion of the video sensor lens. The result of adding the response adjustment value to an edge position value from the horizontal line, produces an edge position value that is the same as the edge position value of the center reference line observing the same object surface.

A table containing edge position normalization data for every possible edge position value of every horizontal line provides better optical correction, although the table requires a significant amount of memory storage. In order to reduce the amount of memory required, edge position normalization data can be collected for a range of edge position values in every horizontal line, reducing the table size. For example, saving an edge position normalization value for a range of 32 edge positions provides adequate optical compensation, while reducing the amount of memory required for the table.

Application of the response adjustment values to the video response edge position values, reduces X position errors and Z elevation errors, caused by the optic lens of the video sensor.

Y Optical Correction

Figure 9A:
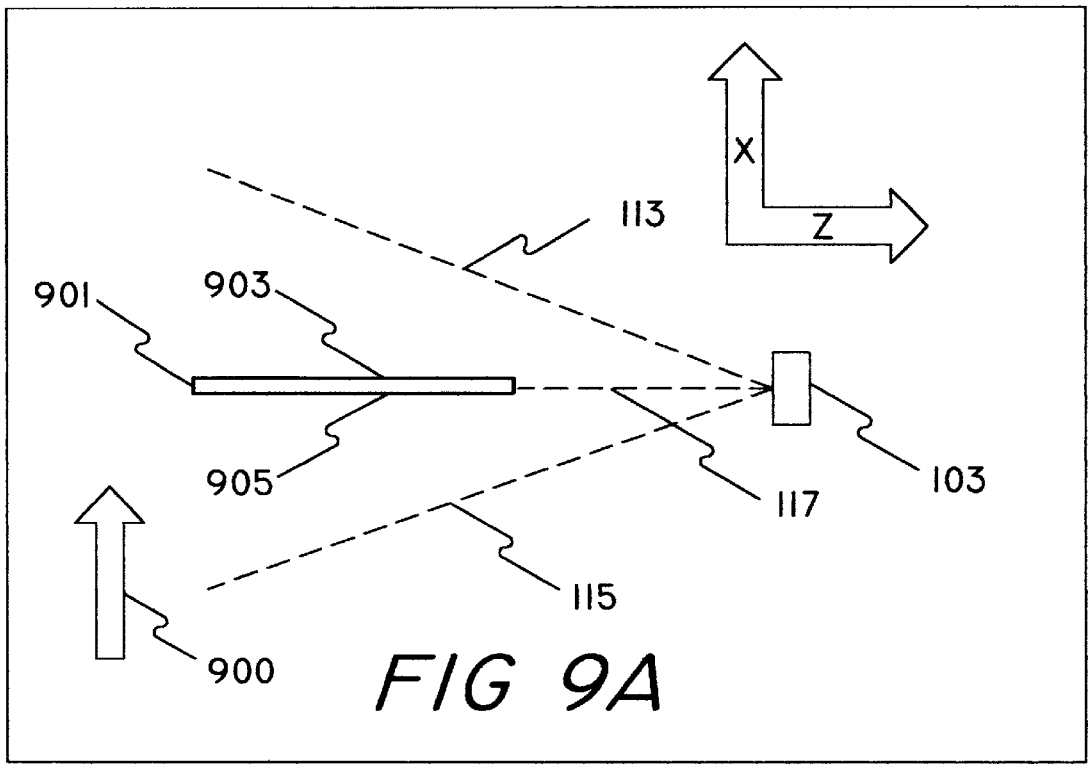
FIG. 9A shows the X/Z view of the Y calibration object relative to the video sensor.

FIG. 9A shows the X/Z view of a Y calibration object 901 relative to the video sensor 103.

The Y calibration object is rectangular in shape and has measurable surfaces 903 and 905 that are parallel to the Y and Z axis of the Figure, and perpendicular to the plane of motion, represented by arrow 900.

Figure 9B:
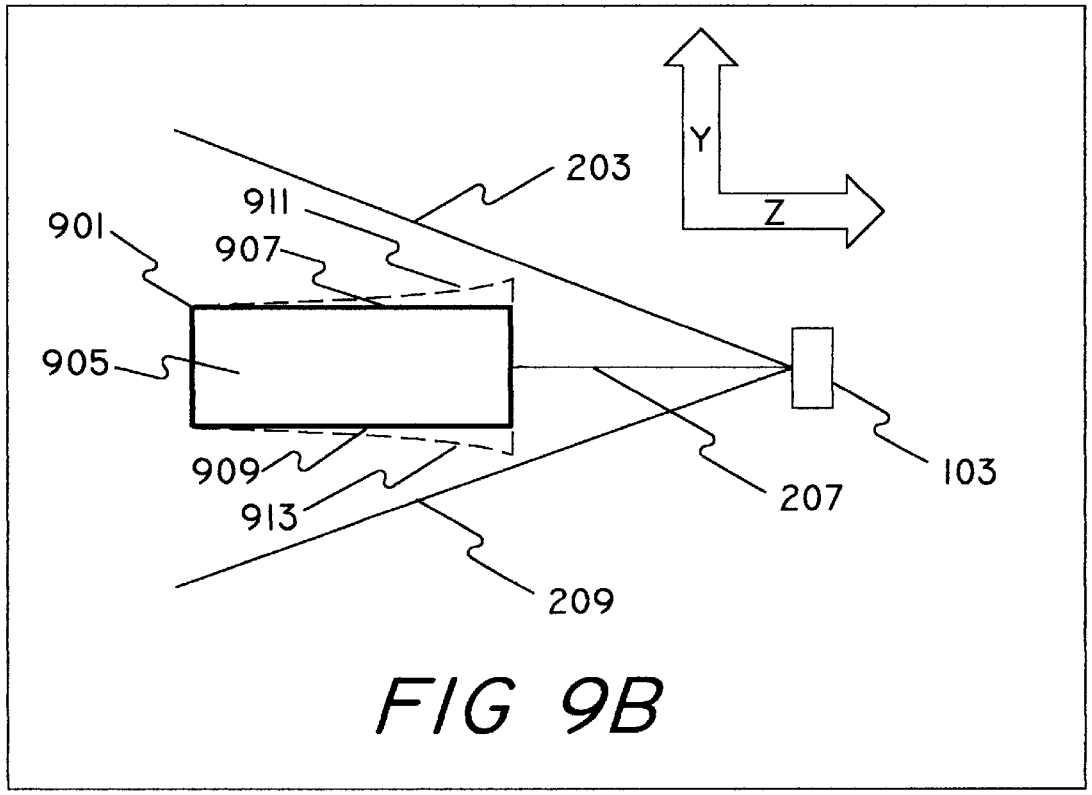
FIG. 9B shows the Y/Z view of the Y calibration object relative to the video sensor.

FIG. 9B shows the Y/Z view of the Y calibration object 901 relative to the video sensor 103.

Surface area 905 is approximately centered on the center horizontal line 207 of the video sensor 103, and is parallel to the Y and Z axis of the Figure. The approximate center alignment of the Y calibration object on the center horizontal line of the video sensor, causes approximately half of the calibration object surface 905 to be observed above the center horizontal line. The approximate lower half of the calibration object surface is observed below the center horizontal line of the video sensor.

The upper reference edge 907 of the Y calibrations object should be close to, but not exceed, the upper Y field of view which is the first horizontal line 203 of the video sensor 103. Likewise, the lower reference edge 909 of the calibration object should be close to, but not exceed, the lower Y field of view which is the last horizontal line 209 of the video sensor.

When object surface 905 is observed during a scanning sequence, the optical effects of the video sensor lens cause more horizontal lines to detect the object surface, as the illuminated surface becomes increasingly closer to the video sensor 103. An increase in the number of horizontal lines detected on the calibration object surface, has the effect of making the calibration object appear to grow larger in the Y axis. This effect may cause the apparent shape of the rectangle to be distorted by a significant amount, as illustrated by the distorted calibration object upper edge 911, and lower edge 913.

To increase the accuracy of measurement in the Y axis, Y correction tables may be derived for the upper and lower halves of the video sensor lens in both perspectives. During a scanning sequence of the calibration object 901, the total of horizontal lines that detect the illuminated surface above and below the center horizontal line 207, are recorded for all possible edge position values of the center horizontal line.

An association can be made between the total lines detecting the illuminated object surface, above and below the center horizontal line at a specific edge position value, and the total lines detecting the illuminated object surface, above and below the center horizontal line at the low common point reference value edge position, that was determined by perspective normalization calibration.

This association may be used to create a Y optic correction table of line correction ratio values, which are applied to the detecting horizontal line number, based upon the edge position value of the detected surface.

The line correction ratio value, associated with the edge position value of the horizontal line that detects an illuminated surface feature in a perspective, is used to adjust the horizontal line, producing an adjusted line number that is closer to the center horizontal line.

Image Interpretation Software

FIGS. 10–18 are the basic flowcharts of the image interpretation software.

New Image Initialization and Processing

Figure 10:
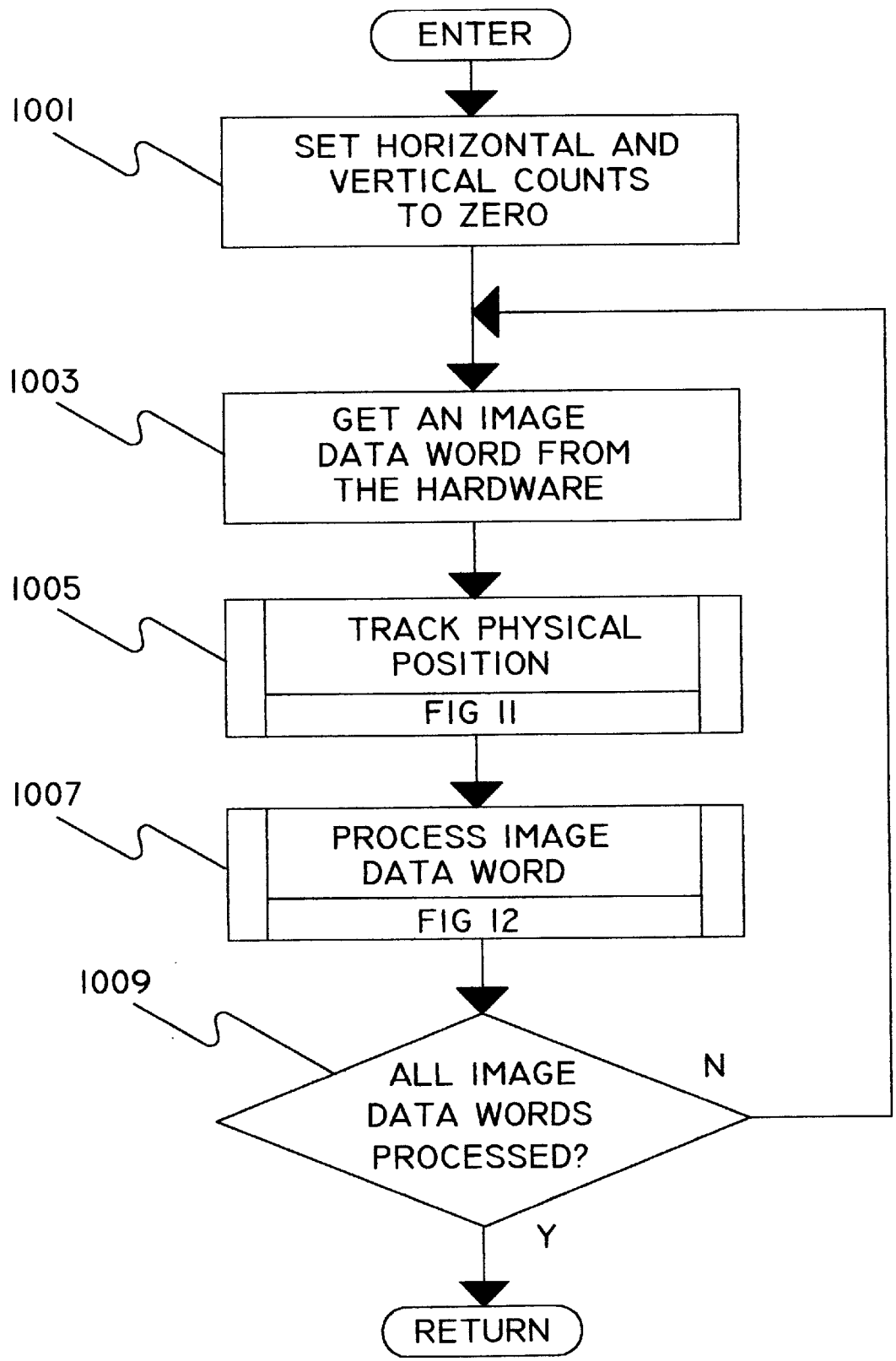
FIG. 10 shows a flowchart for processing an image.

FIG. 10 shows a flowchart for processing an image.

After an image is scanned and entered into the electronic circuits, the process of FIG. 10 is called by the user to start the image interpretation process.

After entry, block 1001 sets a count of frames processed, and a horizontal line count to a known value of zero before processing any image data words from the hardware.

Control is then passed to block 1003, which gets the next image data word from the electronic circuits. Control is then passed to block 1005 which calls track physical position, subroutine FIG. 11, to track the position of the scanner assembly in relation to the object being scanned, and to count new horizontal lines.

Figure 11:
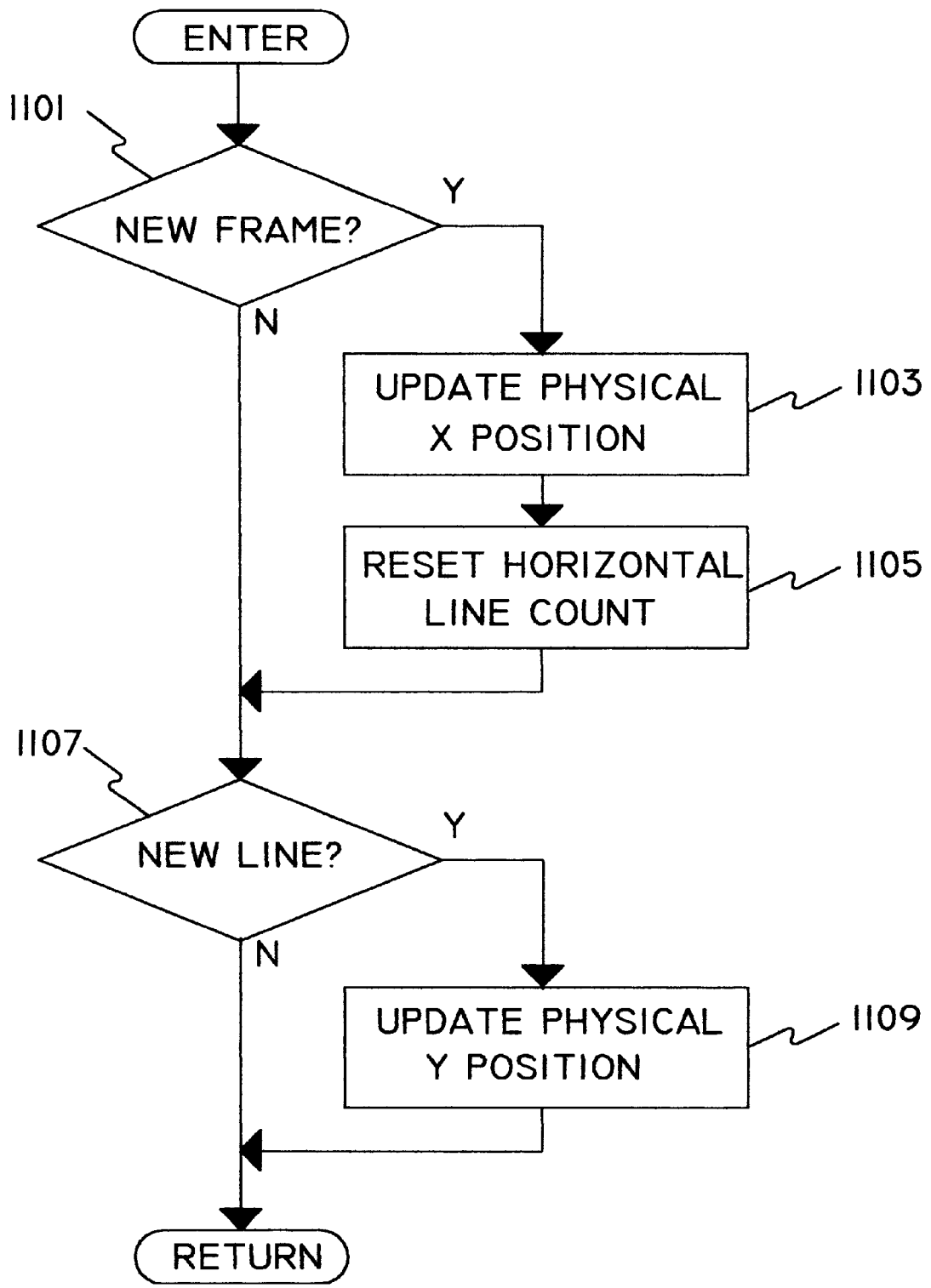
FIG. 11 shows a flowchart for tracking the physical position.
Figure 12:
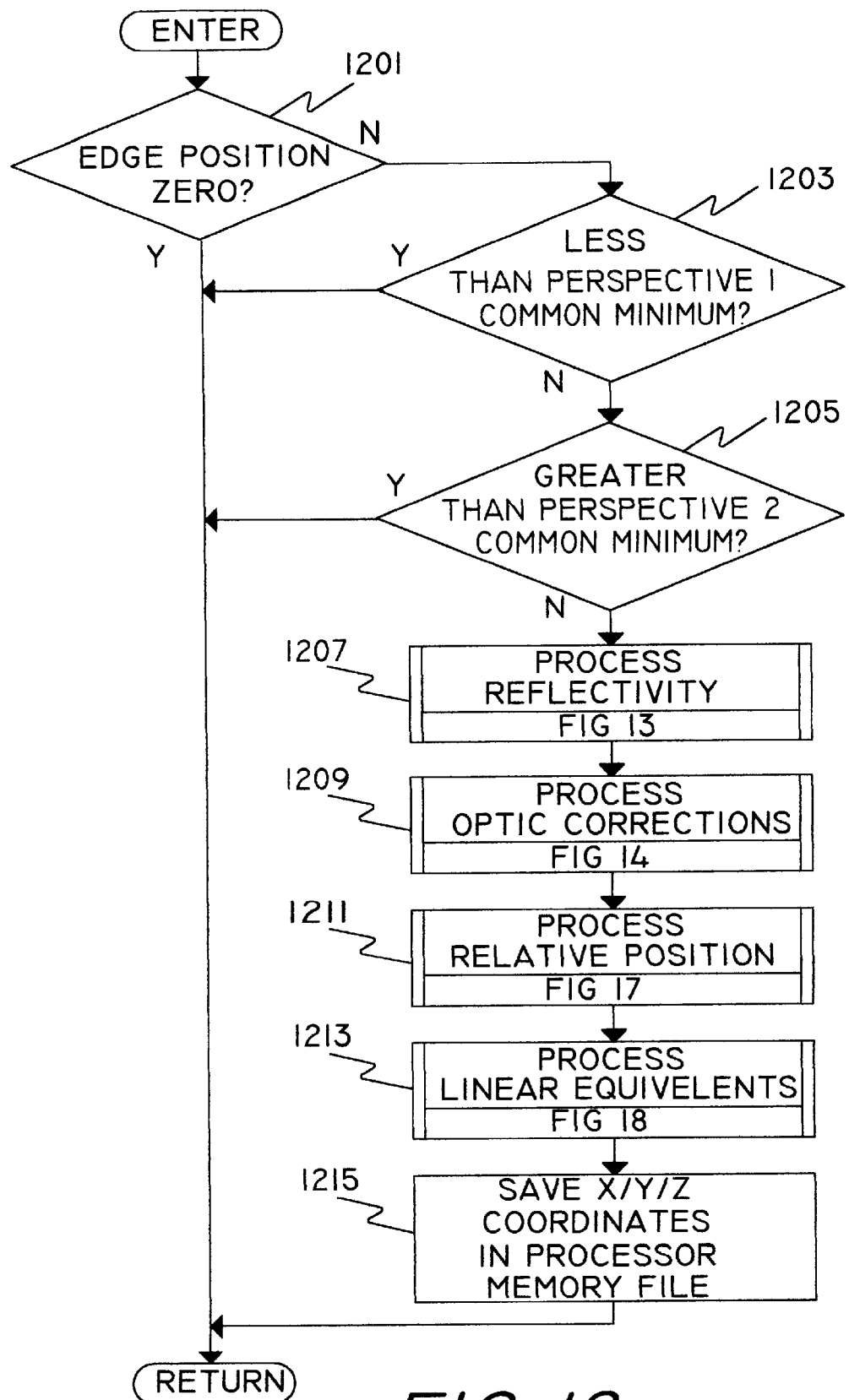
FIG. 12 shows a flowchart for the processing of the image data word.

Upon return from FIG. 11, control is passed to block 1007 which calls process image data word, subroutine FIG. 12, to process the current image data word from the electronic circuits.

Upon return from FIG. 12, control is passed to block 1009 which determines if there are more image data words to be processed, and if there are, returns control to block 1003.

When block 1009 determines that all image data words have been processed, a computer file has been created that contains the X/Y/Z coordinates of all interpreted points of the scanned image, and control is returned to the user.

Physical Position Processing

FIG. 11 shows a flowchart for tracking the physical position, called from block 1005 of FIG. 10.

After entry to FIG. 11, control is passed to block 1101 which evaluates the vertical synchronization field of the image data word that indicates the start of a new frame. When a new frame is indicated, control is passed to block 1103, otherwise control is passed to block 1107.

Block 1103 increments the count of frames that have been encountered, which tracks the physical X position of the scanner assembly relative to the object being scanned. Block 1105 then resets the horizontal line count to zero, since this is the start of a new video frame.

Block 1107 then evaluates the horizontal synchronization field of the image data word that indicates a new line. When a new line is indicated, control is passed to block 1109, otherwise control is returned to FIG. 10.

Block 1109 increments the horizontal line count which is an initial Y position within the current frame, and then returns control to FIG. 10.

Image Data Word Processing

FIG. 12 shows a flowchart for the processing of the image data word, called from block 1007 of FIG. 10.

After entry, block 1201 checks the edge position value field of the image data word for a zero value, and if zero, returns control to FIG. 10, since no video response was detected in the image data word. Otherwise, a video response was detected and control is passed to block 1203, which compares the edge position value to the low common point reference value of perspective one. If the result of the comparison indicates that the edge position value is less than the low common point reference value of perspective one, control is returned to FIG. 10. Otherwise, control passed to block 1205, which compares the edge position value to the low common point reference value of perspective two. If the result of the comparison indicates that the edge position value is greater than the low common point reference value of perspective two, control is returned to FIG. 10. Otherwise, control passed to block 1207, which calls FIG. 13 to process reflectivity.

Figure 13:
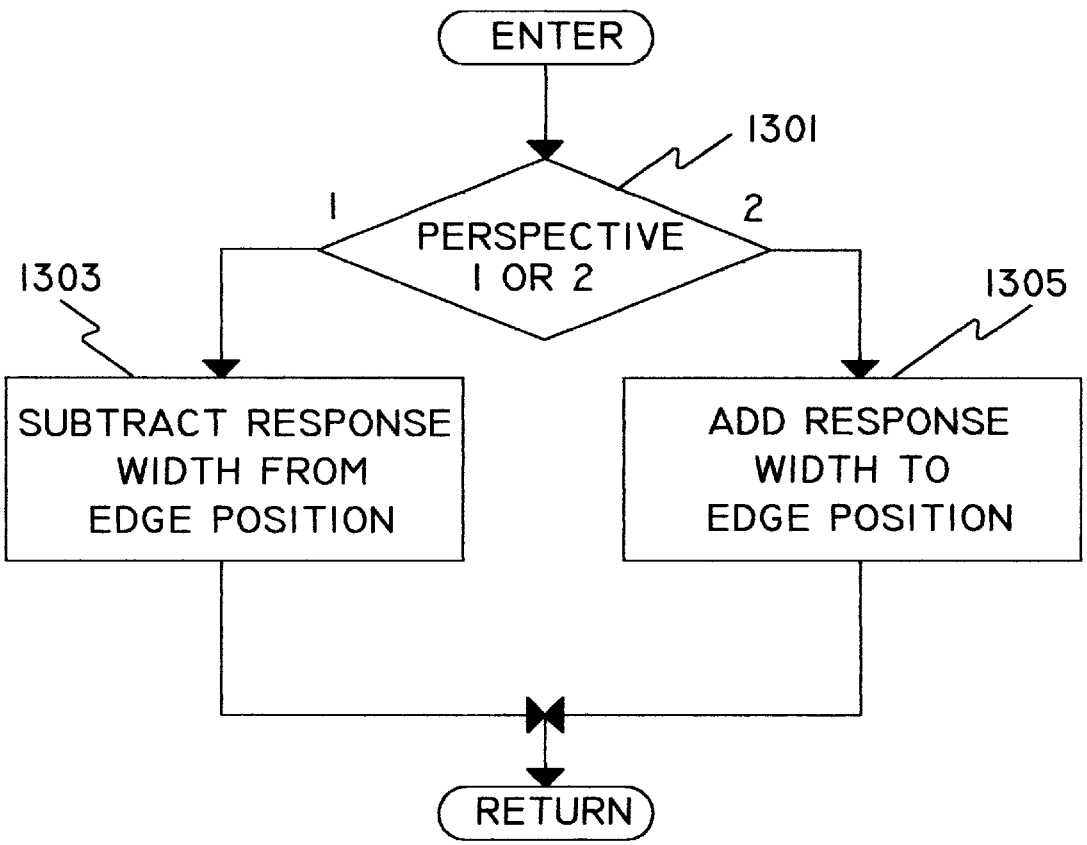
FIG. 13 shows a flowchart for processing reflectivity.
Figure 14:
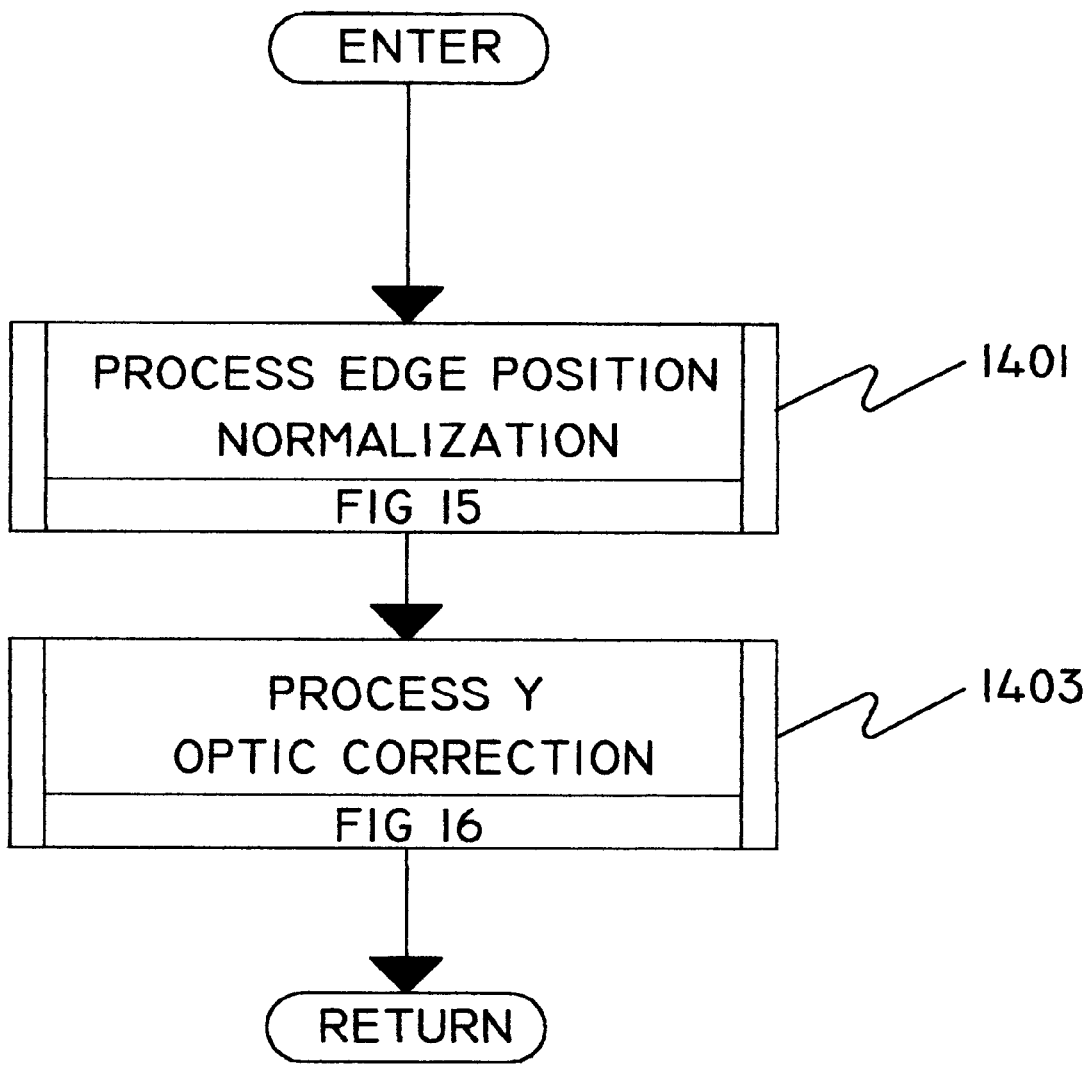
FIG. 14 shows a flowchart for processing optic corrections.

Upon return from FIG. 13, control is passed to block 1209, which calls FIG. 14 to process optic corrections.

Figure 17:
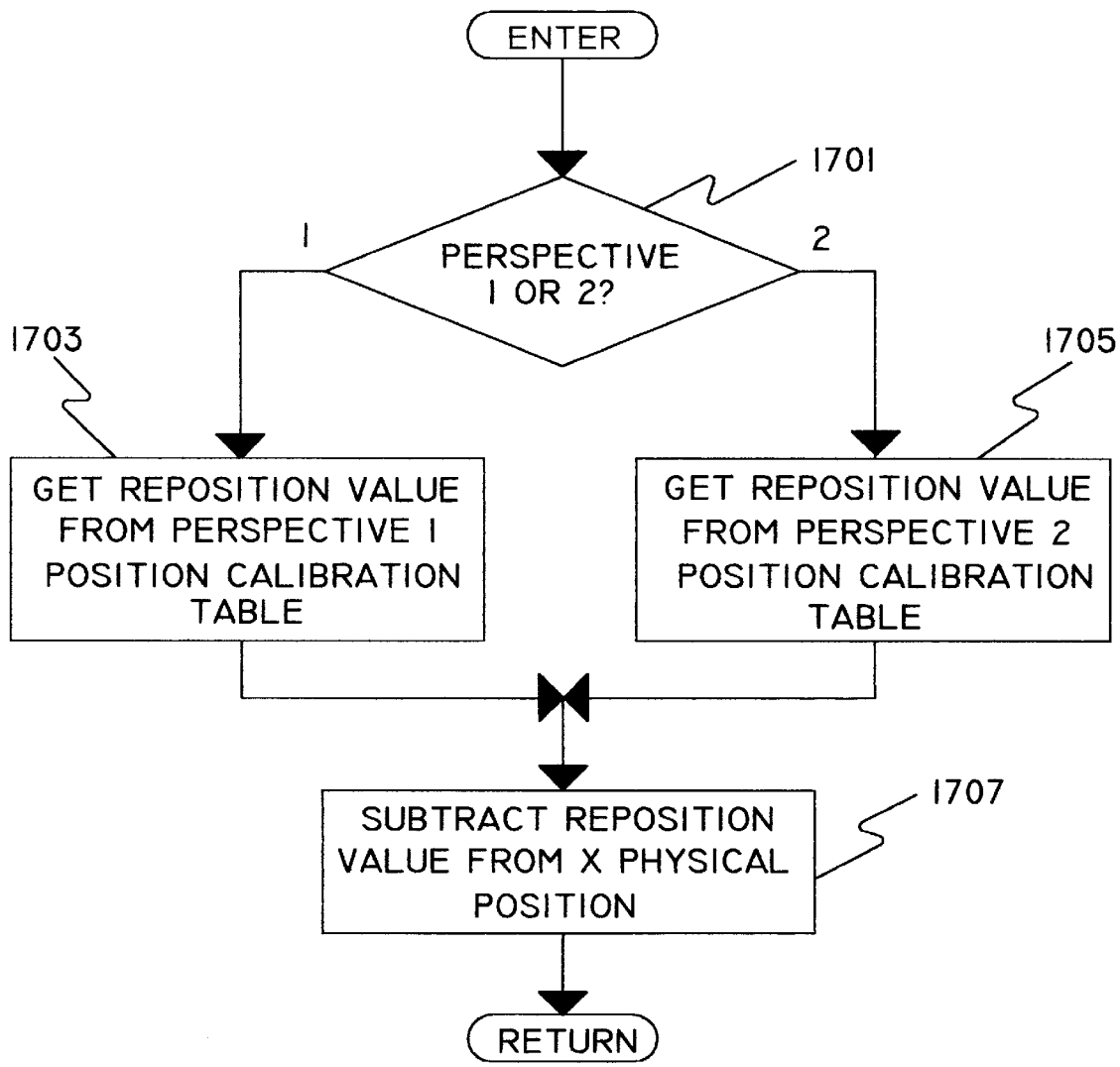
FIG. 17 shows a flowchart for processing relative position.

Upon return from FIG. 14, control is passed to block 1211, which calls FIG. 17 to process relative position.

Figure 18:
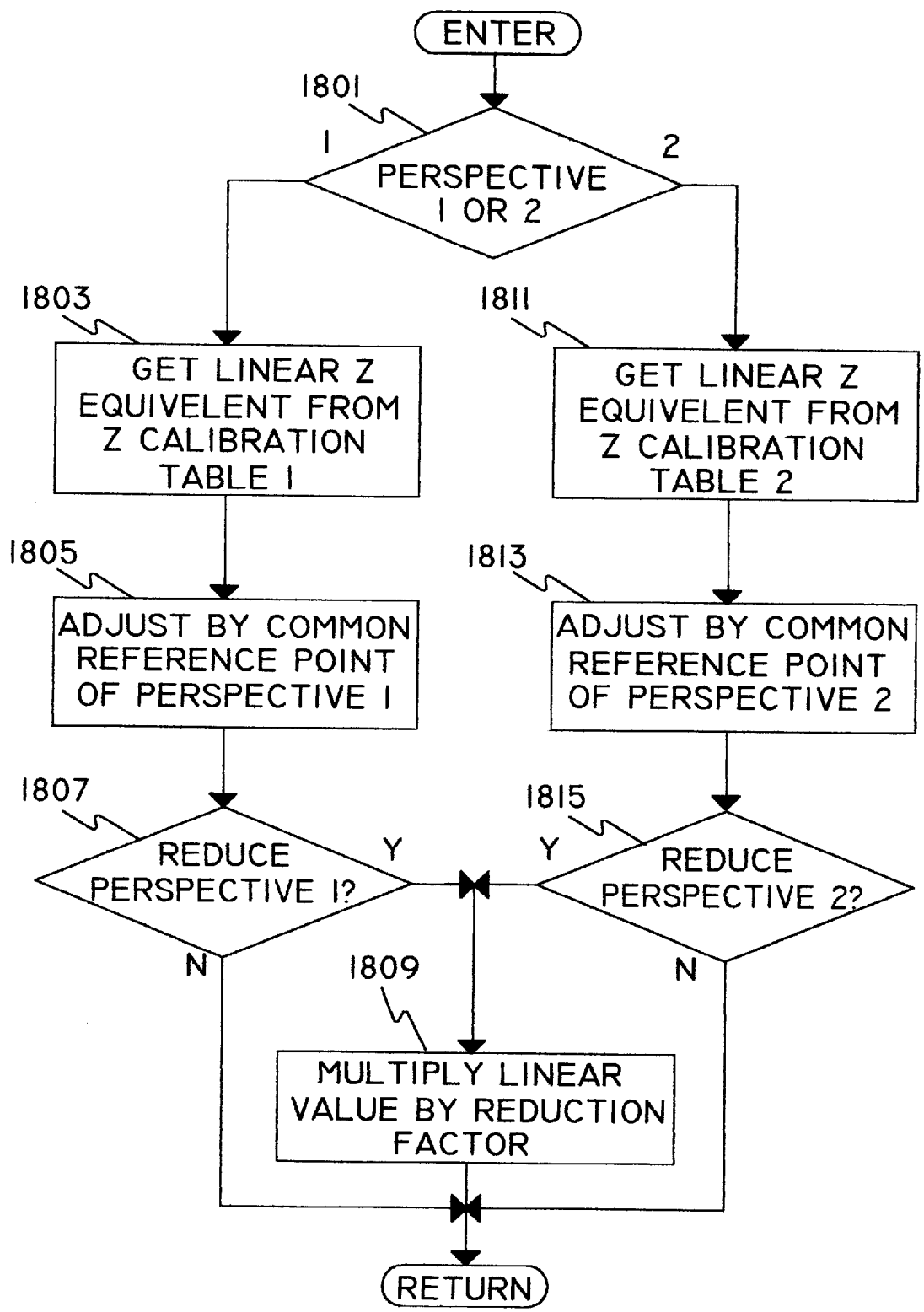
FIG. 18 shows a flowchart for processing linear equivalents.

Upon return from FIG. 17, control is passed to block 1213, which calls FIG. 18 to process linear equivalents.

Upon return from FIG. 18, control is passed to block 1215, which saves an X/Y and Z coordinate determined by the process flowcharts called from FIG. 12. Control is then returned to FIG. 10.

Response Width Processing

FIG. 13 shows a flowchart for processing reflectivity, called from block 1207 of FIG. 12.

After entry to FIG. 13, block 1301 compares the edge position value field of the image data word to the center field of view value, which determines the perspective that recorded the image data word. If the edge position value is less than the center field of view value, the image data word is from perspective one, and control is passed to block 1303. Otherwise, the image data word is from perspective two, and control is passed to block 1305.

Block 1303 subtracts a percentage of the value contained in the response width value field of the image data word from the edge position value, which shifts the trailing edge position value to the center of the synchronized video response. Control is then returned to FIG. 12.

Block 1305 adds a percentage of the value contained in the response width value field of the image data word to the edge position value, which shifts the leading edge position value to the center of the synchronized video response. Control is then returned to FIG. 12.

The percentage used in this implementation, is 50 percent of the response width value, because the response width counter and edge position counter, count at the same rate.

Optical Correction Processing

FIG. 14 shows a flowchart for processing optic corrections called from block 1209 of FIG. 12.

Figure 15:
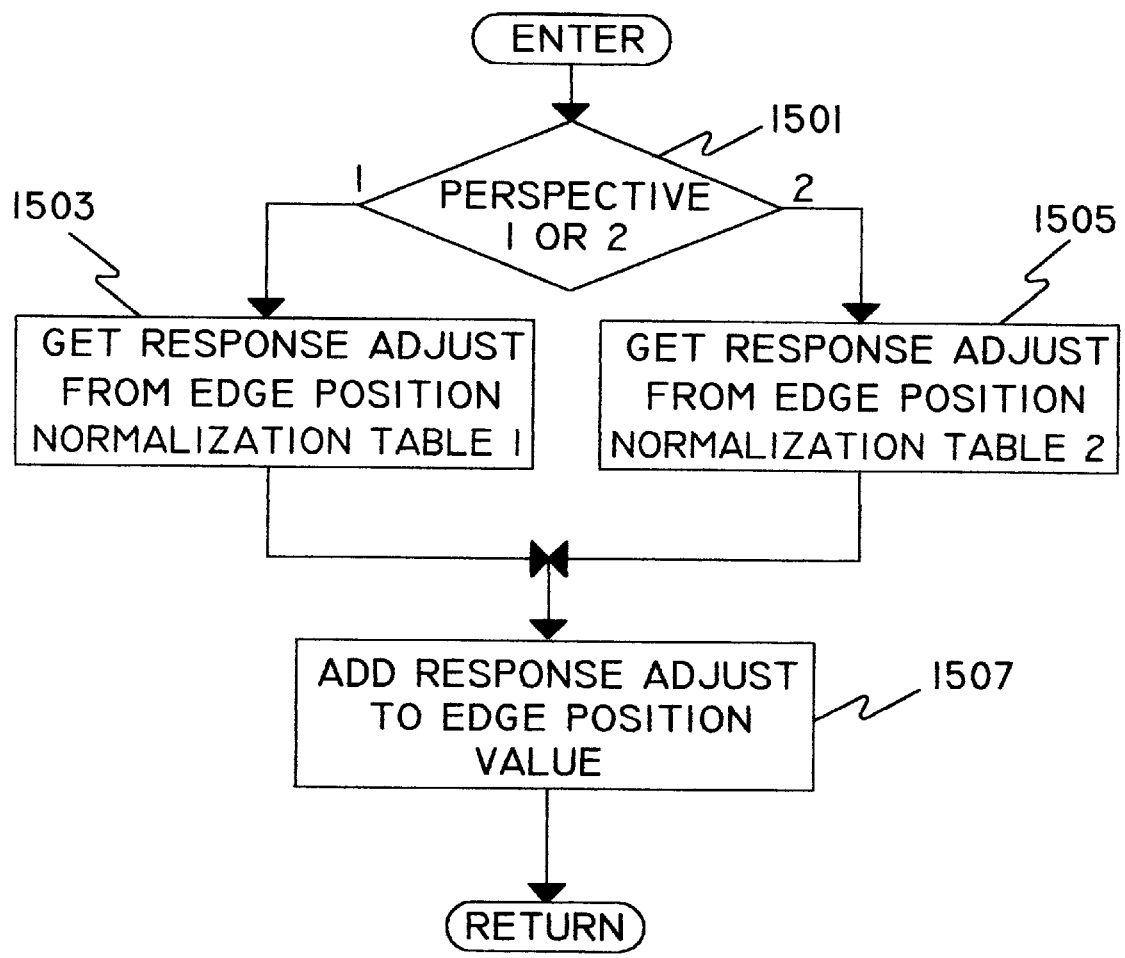
FIG. 15 shows a flowchart of the edge position normalization process.

After entry to FIG. 14, control is passed to block 1401, which calls FIG. 15 to process edge position normalization.

Figure 16:
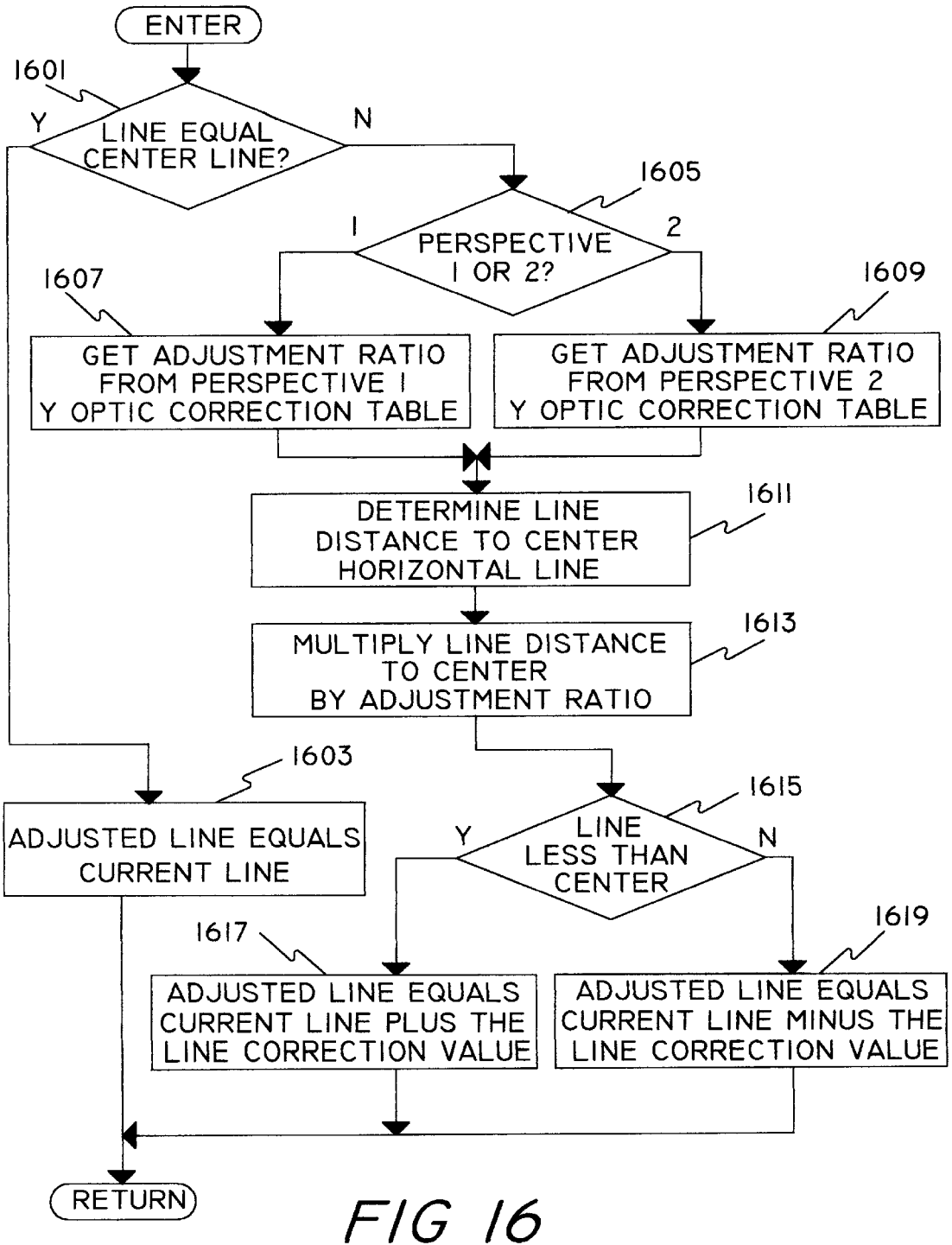
FIG. 16 shows a flowchart for processing Y optic correction.

Upon return from FIG. 15, block 1401 passes control to block 1403 which calls FIG. 16 to process Y optic correction.

Upon return from FIG. 16, block 1403 returns control to FIG. 12.

X/Z Correction Processing

FIG. 15 shows a flowchart of the edge position normalization process, called from block 1401 of FIG. 14.

After entry to FIG. 15, block 1501 compares the edge position value field of the image data word to the center field of view value, which determines the perspective that recorded the image data word. If the edge position value is less than the center field of view value, the image data word is from perspective one, and control is passed to block 1503. Otherwise, the image data word is from perspective two, and control is passed to block 1505.

Block 1503 uses the current horizontal line count and the current edge position value to address a location in the perspective one edge position normalization table, and retrieves the response adjustment value that is contained in that location. As discussed above in Edge Position Normalization description of FIG. 7, if the edge position normalization table size has been reduced, the current edge position value is divided by 32, in order to address the edge position normalization table by the range the edge position value represents. Control is then passed to block 1507.

Block 1505 uses the current horizontal line count and the current edge position value to address a location in the perspective two edge position normalization table, and retrieves the response adjustment value that is contained in that location. As discussed above in Edge Position Normalization description of FIG. 7, if the edge position normalization table size has been reduced, the current edge position value is divided by 32, in order to address the edge position normalization table by the range the edge position value represents. Control is then passed to block 1507.

Block 1507 adds the response adjustment value to the current edge position value, creating a normalized edge position value, and control is then returned to FIG. 14.

Y Correction Processing

FIG. 16 shows a flowchart for processing Y optic correction, called from block 1403 of FIG. 14.

Upon entry to FIG. 16, control is passed to block 1601 which compares the horizontal line count associated with the current image data word, to the center horizontal line value. If the horizontal line count is not equal to the center horizontal line, control is passed to block 1605 and the Y optic correction will be performed. Otherwise, the horizontal line count is equal to the center horizontal line and control is passed to block 1603, which sets an adjusted line count to the horizontal line count, that is also equal to the center horizontal line value, effectively performing no Y optic correction. The adjusted line count is the Y coordinate of the image data word. Control is then returned to FIG. 14.

Block 1605 compares the edge position value field of the image data word to the center field of view value, which determines the perspective that recorded the image data word. If the edge position value is less than the center field of view value, the image data word is from perspective one, and control is passed to block 1607. Otherwise, the image data word is from perspective two, and control is passed to block 1609.

Block 1607 uses the edge position value to address the perspective one Y optic correction table. The ratio value addressed in the perspective one Y optic correction table is saved as a line adjustment multiplier. Control is then passed to block 1611.

Block 1609 uses the edge position value to address the perspective two Y optic correction table. The ratio value addressed in the perspective two optic correction table is saved as the line adjustment ratio multiplier.

Block 1611 then determines the total line difference between the current horizontal line count and the center horizontal line value, producing a current lines from center value.

Block 1613 then multiplies the current lines from center value by the line adjustment ratio multiplier, producing a line adjustment count.

Block 1615 then evaluates the current horizontal line count to determine if its value is less than the center horizontal line value, and if it is less, passes control to block 1617. Otherwise, the horizontal line count is greater than the center horizontal line value, and control is passed to block 1619.

Block 1617 adds the line adjustment count to the current horizontal line count, which produces the adjusted line count that is the Y coordinate of the image data word. Control is then returned to FIG. 14.

Block 1619 subtracts the line adjustment count from the current horizontal line count, which produces the adjusted line count that is the Y coordinate of the image data word. Control is then returned to FIG. 14.

X Relative Position Processing

FIG. 17 shows a flowchart for processing relative position, called from block 1213 of FIG. 12.

After entry to FIG. 17, block 1701 compares the edge position value field of the image data word to the center field of view value, which determines the perspective that recorded the image data word. If the edge position value is less than the center field of view value, the image data word is from perspective one, and control is passed to block 1703. Otherwise, the image data word is from perspective two, and control is passed to block 1705.

Block 1703 uses the normalized edge position value, developed in the edge position normalization process of FIG. 15, to address the position calibration data table of perspective one, and retrieves the reposition value contained at that location of the table. Control is then passed to block 1707.

Block 1705 uses the normalized edge position value, developed in the edge position normalization process of FIG. 15, to address the position calibration data table of perspective two, and retrieves the reposition value contained at that location of the table.

Block 1707 then subtracts the reposition value, from the current frame count that is the current physical X position. The result is the X coordinate associated with the image data word that was recorded in a perspective. Control is then returned to FIG. 12.

Z Translation Process

FIG. 18 shows a flowchart for processing linear equivalents, called by block 1213 of FIG. 12.

After entry to FIG. 18, block 1801 compares the edge position value field of the image data word to the center field of view value, which determines the perspective that provided the image data word. If the edge position value is less than the center field of view value, the image data word is from perspective one, and control is passed to block 1803. Otherwise, the image data word is from perspective two, and control is passed to block 1811.

Block 1803 uses the normalized edge position value, that was developed in the edge position normalization process of FIG. 15, to address the Z calibration data table of perspective one. The value retrieved from the Z calibration data table location is the linear Z equivalent value, associated with the normalized edge position value from perspective one. Control is then passed to block 1805 which reduces the linear Z value from perspective one, by the linear equivalent value of the low common point reference value of perspective one. Control is then passed to block 1807 which evaluates the reduce perspective one indication, developed during perspective normalization calibration, to determine if linear Z values of perspective one are to be reduced. If perspective one linear Z values are not to be reduced, the linear Z value is used as the Z coordinate associated with the image data word, and control is then returned to FIG. 12. Otherwise, perspective one linear Z values will be reduced, and control is passed to block 1809.

Block 1811 uses the normalized edge position value, that was developed in the edge position normalization process of FIG. 15, to address the Z calibration data table of perspective two. The value retrieved from the Z calibration data table location is the linear Z equivalent value, associated with the normalized edge position value from perspective two. Control is then passed to block 1813 which reduces the linear Z value from perspective two, by the linear equivalent value of the low common point reference value of perspective two. Control is then passed to block 1815 which evaluates the reduce perspective two indication, developed during perspective normalization calibration, to determine if linear Z values of perspective two are to be reduced. If perspective two linear Z values are not to be reduced, the linear Z value is used as the Z coordinate associated with the image data word, and control is then returned to FIG. 12. Otherwise, perspective two linear Z values will be reduced, and control is passed to block 1809.

Block 1809 multiplies the linear Z value, by the reduction ratio value determined during perspective normalization calibration, producing a reduced linear Z value that is used as the Z coordinate associated with the image data word. Control is then returned to FIG. 12.

Conclusions

In the previous image processing flowcharts, all detected points of the scanned object were mapped to X, Y, and Z coordinates within a single map memory file.

Some applications, such as non-contacting inspection type applications may find it more useful, or effective, to develop separate map files for each perspective. Likewise, some inspection type applications may not require all calibration and processing software when measurement is not required, and only a comparison to a known object image is needed to accomplish the inspection.

It should be considered that multiple viewing directions can be combined by iterations of this specification, applying the same theories of calibration using common points and known object shapes.

The details of the present invention are given by way of example and are not intended to limit the spirit or scope of the invention as set forth in the claims.

What is claimed is:

1. An optical scanner for performing non-contacting three dimensional measurement of a surface of an object, the optical scanner comprising:

a light sensor for detecting a plurality of light points reflected from the surface of the object;

a first light source for illuminating the surface of the object, wherein the light source emits a first plane of light, substantially narrower than a field of view of the light sensor, at a first acute angle to a center line of the field of view of the light sensor, and further wherein the first light source emits the first plane of light at a second acute angle to an edge of a field of view of the light sensor;

a second light source for illuminating the surface of the object, wherein the second light source emits a second plane of light, substantially the same width as the first plane of light emitted by the first light source, wherein the second light source emits the second plane of light from a position on a side of the center line of the field of view of the light sensor that is opposite the position of the first light source, and further wherein the second plane of light crosses the first plane of light at a light crossing point, and still further wherein a third acute angle, formed between the second plane of light and the center line of the field of view of the light sensor, is substantially the same as the first acute angle, and still further wherein a fourth acute angle formed between the second plane of light and a second edge of the field of view of the light sensor is substantially the same as the second acute angle;

a movable surface for mounting the light sensor and the first and second light sources, and for moving the light sensor and the first and second light sources perpendicular to the center of the field of view of the light sensor, to expose points on the surface of the object;

a fixed surface for mounting the object, wherein the object is mounted between the light crossing point and points where the first and second planes of light exit the field of view of the light sensor;

a first time measurement circuit connected to the light sensor for measuring a time between the second edge of the field of view of the light sensor and a falling edge of a last signal occurring before the center line of the field of view of the light sensor, wherein the last signal represents light reflected from the object surface and sensed by the light sensor as the movable surface is moved in front of the object;

a second time measuring circuit connected to the light sensor for measuring a time between the second edge of the field of view of the light sensor and a rising edge of a first signal occurring after the center line of the field of view of the light sensor, wherein the first signal represents light reflected from the object surface and sensed by the light sensor as the movable surface is moved in front of the object; and a memory for storing a word containing each time measurement and a vertical location of each of the plurality of light points, wherein each word stored defines a measurement of a three dimensional point on the surface of the object.

2. The optical scanner of claim 1 wherein the light sensor comprises a video camera, and further wherein one of the plurality of light points is detectable on each horizontal scan line signal from the video camera.

3. An optical scanner for performing non-contacting three dimensional measurement of a surface of an object, the optical scanner comprising:

a light sensor for detecting a plurality of light points reflected from the surface of the object;

a first light source for illuminating the surface of the object, wherein the light source emits a first plane of light, substantially narrower than a field of view of the light sensor, at a first acute angle to a center line of the field of view of the light sensor, and further wherein the first light source emits the first plane of light at a second acute angle to an edge of a field of view of the light sensor;

a second light source for illuminating the surface of the object, wherein the second light source emits a second plane of light, substantially the same width as the first plane of light emitted by the first light source, wherein the second light source emits the second plane of light from a position on a side of the center line of the field of view of the light sensor that is opposite the position of the first light source, and further wherein the second plane of light crosses the first plane of light at a light crossing point, and still further wherein a third acute angle, formed between the second plane of light and the center line of the field of view of the light sensor, is substantially the same as the first acute angle, and still further wherein a fourth acute angle formed between the second plane of light and a second edge of the field of view of the light sensor is substantially the same as the second acute angle;

a fixed surface for mounting the light sensor and the first and second light sources;

a movable surface for mounting the object, and for moving the object perpendicular to the center of the field of view of the light sensor, to expose points on the surface of the object, wherein the object is mounted to remain between the light crossing point and points where the first and second planes of light exit the field of view of the light sensor;

a first time measurement circuit connected to the light sensor for measuring a time between the second edge of the field of view of the light sensor and a falling edge of a last signal occurring before the center line of the field of view of the light sensor, wherein the last signal represents light reflected from the object surface and sensed by the light sensor as the movable surface is moved in front of the light sensor and the first and second light source;

a second time measuring circuit connected to the light sensor for measuring a time between the second edge of the field of view of the light sensor and a rising edge of a first signal occurring after the center line of the field of view of the light sensor, wherein the first signal represents light reflected from the object surface and sensed by the light sensor as the movable surface is moved in front of the light sensor and the first and second light source; and a memory for storing a word containing each time measurement and a vertical location of each of the plurality of light points, wherein each word stored defines a measurement of a three dimensional point on the surface of the object.

4. The optical scanner of claim 3 wherein the light sensor comprises a video camera, and further wherein one of the plurality of light points is detectable on each horizontal scan line signal from the video camera.

* * * * *